(12) United States Patent
Sasaki et al.

(10) Patent No.: US 7,609,479 B2
(45) Date of Patent: Oct. 27, 2009

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Dong-Hong Li, Milpitas, CA (US); Joseph Smyth, Milpitas, CA (US); Lijie Guan, Milpitas, CA (US); Yaw-Shing Tang, Saratoga, CA (US)

(73) Assignee: Headway Technologies, Inc., Milpitas, CA (US)

( * ) Notice: Subject to any disclaimer, the term of this patent is extended or adjusted under 35 U.S.C. 154(b) by 356 days.

(21) Appl. No.: 11/372,259

(22) Filed: Mar. 10, 2006

(65) Prior Publication Data

US 2007/0211377 A1 Sep. 13, 2007

(51) Int. Cl.
*G11B 5/127* (2006.01)
(52) U.S. Cl. ............... 360/125.3; 360/125.27; 360/125.29; 360/125.02
(58) Field of Classification Search ...............
360/123.02–123.12, 125.02–125.13, 125.27, 360/125.29, 125.3
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 7,002,775 B2 * | 2/2006 | Hsu et al. | 360/125.03 |
| 7,295,401 B2 * | 11/2007 | Jayasekara et al. | 360/125.08 |
| 7,322,095 B2 * | 1/2008 | Guan et al. | 29/603.07 |
| 2002/0176214 A1 * | 11/2002 | Shukh et al. | 360/317 |
| 2003/0151850 A1 | 8/2003 | Nakamura et al. | |
| 2005/0068678 A1 * | 3/2005 | Hsu et al. | 360/126 |
| 2005/0083605 A1 * | 4/2005 | Hu et al. | 360/125 |
| 2005/0128637 A1 * | 6/2005 | Johnston et al. | 360/125 |
| 2005/0141137 A1 | 6/2005 | Okada et al. | |
| 2005/0190479 A1 * | 9/2005 | Terris et al. | 360/59 |
| 2005/0237665 A1 * | 10/2005 | Guan et al. | 360/125 |
| 2005/0243463 A1 * | 11/2005 | Fontana et al. | 360/126 |
| 2006/0002014 A1 * | 1/2006 | Sasaki et al. | 360/125 |

(Continued)

FOREIGN PATENT DOCUMENTS

JP  2005092929 A  *  4/2005

(Continued)

*Primary Examiner*—William J Klimowicz
(74) *Attorney, Agent, or Firm*—Oliff & Berridge, PLC

(57) ABSTRACT

A pole layer has an end face located in a medium facing surface, allows a magnetic flux corresponding to a magnetic field generated by a coil to pass therethrough, and generates a write magnetic field for writing data on a recording medium by using a perpendicular magnetic recording system. A shield incorporates: a first layer having an end face located in a region of the medium facing surface forward of the end face of the pole layer along the direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion.

28 Claims, 31 Drawing Sheets

U.S. PATENT DOCUMENTS

2006/0103977 A1\* 5/2006 Lee et al. .................... 360/125
2007/0121248 A1\* 5/2007 Sasaki et al. ................ 360/126
2008/0024911 A1\* 1/2008 Sasaki et al. ................ 360/110
2008/0088972 A1\* 4/2008 Sasaki et al. ................ 360/110

FOREIGN PATENT DOCUMENTS

JP A-2005-190518 7/2005
JP 2006012378 A \* 1/2006

\* cited by examiner

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, are degraded. It is therefore required to achieve better write characteristics as the track width is reduced.

A magnetic head used for a magnetic disk drive such as a hard disk drive is typically provided in a slider. The slider has a medium facing surface that faces toward a recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in U.S. Patent Application Publication US 2003/0151850 A1, for example. According to this technique, the end face of the pole layer located in the medium facing surface is made to have a shape in which the side located backward along the direction of travel of the recording medium (that is, the side located closer to the air inflow end of the slider) is shorter than the opposite side.

As a magnetic head for perpendicular magnetic recording, a magnetic head comprising the pole layer and a shield is known, as disclosed in U.S. Pat. No. 4,656,546, for example. In the medium facing surface of this magnetic head, an end face of the shield is located forward of the end face of the pole layer along the direction of travel of the recording medium with a specific small space therebetween. Such a magnetic head will be hereinafter called a shield-type head. In the shield-type head, the shield prevents a magnetic flux from reaching the recording medium, the flux being generated from the end face of the pole layer and extending in directions except the direction orthogonal to the surface of the recording medium. In addition, the shield has a function of returning the magnetic flux that has been generated from the end face of the pole layer and has magnetized the recording medium. The shield-type head achieves a further improvement in linear recording density.

U.S. Pat. No. 4,672,493 discloses a magnetic head having such a structure that magnetic layers are respectively provided forward and backward of a middle magnetic layer to be a pole layer along the direction of travel of a recording medium and that coils are respectively provided between the middle magnetic layer and the magnetic layer located forward and between the middle magnetic layer and the magnetic layer located backward. According to the magnetic head, it is possible to increase components in the direction orthogonal to the surface of the recording medium among components of the magnetic field generated from an end of the middle magnetic layer closer to the medium facing surface.

Reference is now made to FIG. 43 to describe a basic configuration of the shield-type head. FIG. 43 is a cross-sectional view of the main part of an example of the shield-type head. This shield-type head comprises: a medium facing surface 100 that faces toward a recording medium; a coil 101 for generating a magnetic field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulting layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 43, the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. The throat height TH influences the intensity and distribution of the field generated from the pole layer 102 in the medium facing surface 100.

In the shield-type head as shown in FIG. 43, for example, it is preferred to reduce the throat height TH to improve the overwrite property. It is required that the throat height TH be 0.1 to 0.3 micrometer (μm), for example. When such a small throat height TH is required, the following two problems arise in the head of FIG. 43.

The first problem of the head of FIG. 43 is that it is difficult to define the throat height TH with accuracy. The first problem will now be described in detail. In the head of FIG. 43, the throat height TH is defined by the thickness of a portion of the shield layer 103 located between the insulating layer 105 and the medium facing surface 100. In addition, the throat height TH is controlled by the depth to which the medium facing surface 100 is polished. However, the photoresist constituting the insulating layer 105 has a relatively high thermal expansion coefficient and is relatively soft. As a result, the insulating layer 105 expands due to the heat produced when polishing is performed, for example. In addition, the portion of the shield layer 103 located between the insulating layer 105 and the medium facing surface 100 is thin, particularly when the throat height TH is small. Furthermore, the end face of the shield layer 103 is exposed in a large region in the medium facing surface. Because of these factors, particularly in the case where the throat height TH is small, when the medium facing surface 100 is polished, the insulating layer 105 expands and the end portion of the shield layer 103 closer to the medium facing surface 100 tends to protrude. Consequently, the thickness of the portion of the shield layer 103 located between the insulating layer 105 and the medium facing surface 100 varies when the medium facing surface 100 is polished, which results in variations in throat height TH after the medium facing surface 100 is polished.

The second problem of the head of FIG. 43 is that, when the head is operated, the insulating layer 105 expands due to the heat generated by the coil 101, and the end portion of the shield layer 103 closer to the medium facing surface 100 thereby protrudes. The protrusion of the end portion of the shield layer 103 when the head is operated induces collision of the slider with the recording medium.

For the shield-type head as shown in FIG. 43, for example, there are some cases in which such a phenomenon noticeably arises that there occurs attenuation of signals written on one or more tracks adjacent to the track that is a target of writing or reading in a wide range along the direction of track width (The phenomenon will be hereinafter called wide-range adjacent track erase). It is assumed that one of reasons for the wide-range adjacent track erase is that, as will be described later, no shield layer exists backward of the end face of the pole layer 102 along the direction T of travel of the recording medium (that is, on a side of the end face of the pole layer 102 farther from the end face of the shield layer 103).

The magnetic flux that has been generated from the end face of the pole layer 102 and has magnetized the recording medium returns to the head. At this time, the magnetic flux is taken in by the shield layer 103 in a region forward of the end face of the pole layer 102 along the direction T of travel of the recording medium, so that expansion of the magnetic flux is suppressed. However, in a region backward of the end face of the pole layer 102 along the direction T of travel of the recording medium, the magnetic flux expands since no shield layer exists. It is assumed that this causes the wide-range adjacent track erase.

Since a portion of the pole layer 102 near the medium facing surface 100 defines the track width, this portion is smaller in width than the other portion. As a result, there is a possibility that part of the magnetic flux passing through the pole layer 102 leaks from the pole layer 102 before reaching the end face of the pole layer 102. Since the leakage flux is taken in by the shield layer 103 in the region forward of the end face of the pole layer 102 along the direction T of travel of the recording medium, the leakage flux reaching the recording medium is suppressed. However, in a region backward of the end face of the pole layer 102 along the direction T of travel of the recording medium, the leakage flux reaches the recording medium since no shield layer exists. It is assumed that this is another cause of the wide-range adjacent track erase.

According to the magnetic head having a structure as disclosed in U.S. Pat. No. 4,672,493, it is assumed that it is possible to suppress the wide-range adjacent track erase caused by the foregoing factors. However, the magnetic head having such a structure is not capable of solving the foregoing problems, that is, the first problem that it is difficult to define the throat height with accuracy and the second problem that the end portion of the shield layer closer to the medium facing surface protrudes due to the heat produced by the coil.

OBJECT AND SUMMARY OF THE INVENTION

It is an object of the invention to provide a magnetic head for perpendicular magnetic recording having a structure in which an end face of a pole layer and an end face of a shield are adjacent to each other with a gap layer disposed in between in a medium facing surface, the head being capable of defining the throat height with accuracy, suppressing protrusion of an end portion of the shield closer to the medium facing surface due to the heat produced by the coil, and suppressing the wide-range adjacent track erase, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of a perpendicular magnetic recording system; and a shield.

The shield incorporates: a first layer having an end face located in a region of the medium facing surface forward of the end face of the pole layer along a direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion. The magnetic head further comprises a gap layer made of a nonmagnetic material and disposed between the pole layer and the first layer. In the medium facing surface, the end face of the first layer is located at a specific distance created by a thickness of the gap layer from the end face of the pole layer. The end face of the pole layer has a side located adjacent to the gap layer, the side defining the track width. Part of the coil passes through a space surrounded by the pole layer, the second layer, the first coupling portion and the second coupling portion.

A method of manufacturing the magnetic head for perpendicular magnetic recording of the invention comprises the steps of: forming the second layer; forming the coil; forming the first and second coupling portions; forming the pole layer; forming the gap layer on the pole layer; and forming the first layer on the gap layer.

According to the magnetic head for perpendicular magnetic recording of the invention or the method of manufacturing the same, the first and second layers of the shield are disposed in the regions sandwiching the pole layer. The first and second layers are coupled to each other by the first coupling portion, and the pole layer and the second layer are coupled to each other by the second coupling portion. Part of the coil passes through the space surrounded by the pole layer, the second layer, the first coupling portion and the second coupling portion.

In the magnetic head of the invention or the method of manufacturing the same, the gap layer may have a thickness that falls within a range of 5 to 60 nm inclusive.

In the magnetic head of the invention or the method of manufacturing the same, each of the second layer and the first coupling portion may have an end face located in the medium facing surface.

In the magnetic head of the invention or the method of manufacturing the same, the second layer may have an end face closer to the medium facing surface, the end face being located at a distance from the medium facing surface.

In the magnetic head of the invention or the method of manufacturing the same, the first coupling portion may have an end face closer to the medium facing surface, the end face being located at a distance from the medium facing surface.

In the magnetic head of the invention or the method of manufacturing the same, the first coupling portion may couple the first layer to the second layer on both sides of the pole layer opposed to each other in the direction of track width. In this case, the first coupling portion may incorporate: a first portion and a second portion that are connected to the first layer and disposed on both sides of the pole layer opposed to each other in the direction of track width; and a third portion coupling the second layer to the first and second portions and disposed between the medium facing surface and the part of the coil.

In the magnetic head of the invention or the method of manufacturing the same, the shield may further incorporate a first side shield layer and a second side shield layer that are connected to the first layer and disposed on both sides of the pole layer opposed to each other in the direction of track width, and each of the first and second side shield layers may have an end face located in the medium facing surface. In this case, the method may further comprise the step of forming the first and second side shield layers performed between the step of forming the second layer and the step of forming the gap layer.

In the magnetic head of the invention or the method of manufacturing the same, the coil may have a shape of flat whorl wound around the second coupling portion, or a helical shape wound around the pole layer.

The magnetic head of the invention may further comprise: an encasing layer made of a nonmagnetic material and having a groove that opens in a top surface thereof and accommodates at least part of the pole layer; and a nonmagnetic conductive layer made of a nonmagnetic conductive material and disposed in the groove of the encasing layer between the encasing layer and the pole layer. The method of manufacturing the magnetic head of the invention may further comprise the steps of forming the encasing layer and forming the nonmagnetic conductive layer. In this case, the nonmagnetic conductive layer may be formed by chemical vapor deposition in which formation of a single atomic layer is repeated. The nonmagnetic conductive material may be Ta or Ru.

In the magnetic head of the invention or the method of manufacturing the same, the pole layer may have a surface that bends, the surface touching the gap layer, and the gap layer may bend along the surface of the pole layer that bends. In this case, the gap layer may be formed by chemical vapor deposition in which formation of a single atomic layer is repeated. The nonmagnetic material forming the gap layer may be Ta, Ru or $Al_2O_3$.

According to the magnetic head for perpendicular magnetic recording of the invention or the method of manufacturing the same, the first and second layers of the shield are disposed in the regions sandwiching the pole layer. As a result, according to the invention, it is possible to suppress the wide-range adjacent track erase. According to the invention, part of the coil passes through the space surrounded by the pole layer, the second layer, the first coupling portion and the second coupling portion. As a result, according to the invention, it is possible to suppress protrusion of the end portion of the first layer closer to the medium facing surface due to expansion of the insulating layer disposed around the coil. Consequently, the invention makes it possible to define the throat height with accuracy and to suppress protrusion of the end portion of the shield closer to the medium facing surface due to the heat produced by the coil.

Other and further objects, features and advantages of the invention will appear more fully from the following description.

DETAILED DESCRIPTION OF THE PREFERRED EMBODIMENTS

First Embodiment

Figure 1:
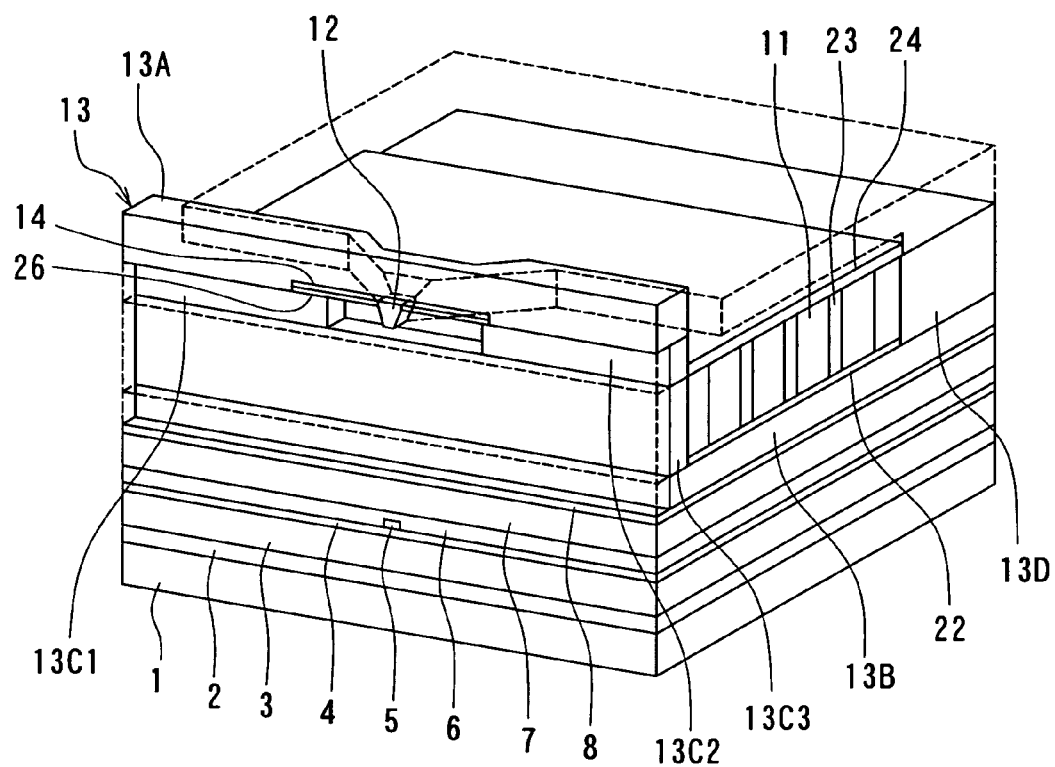
FIG. 1 is a perspective view illustrating a portion of a magnetic head of a first embodiment of the invention in a neighborhood of the medium facing surface.
Figure 2:
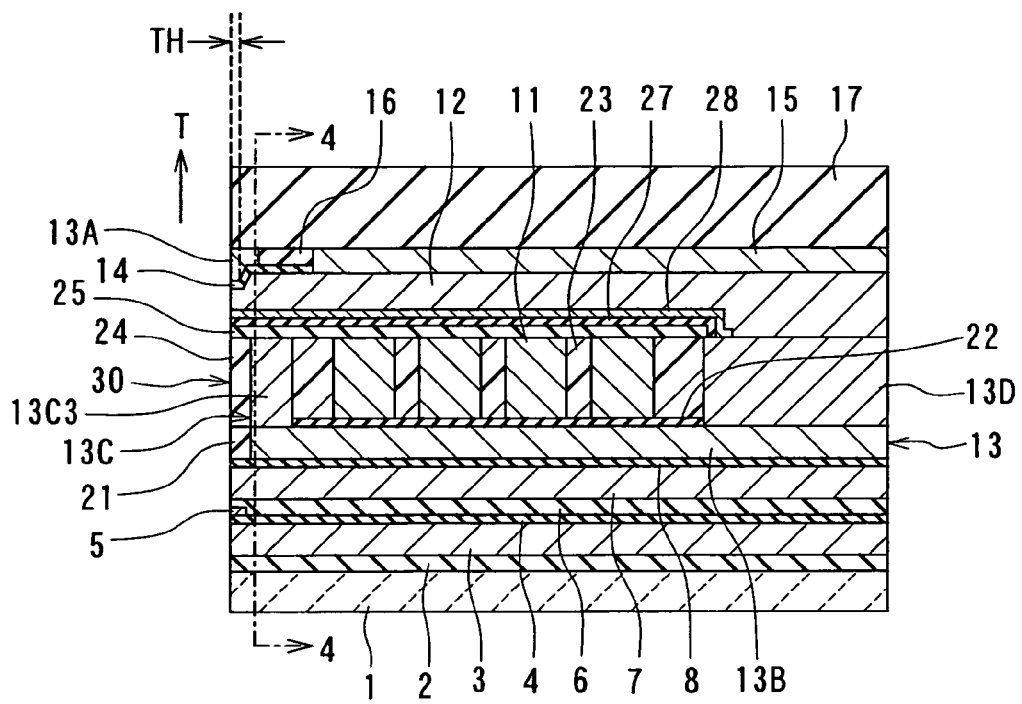
FIG. 2 is a cross-sectional view for illustrating the configuration of the magnetic head of the first embodiment of the invention.
Figure 3:
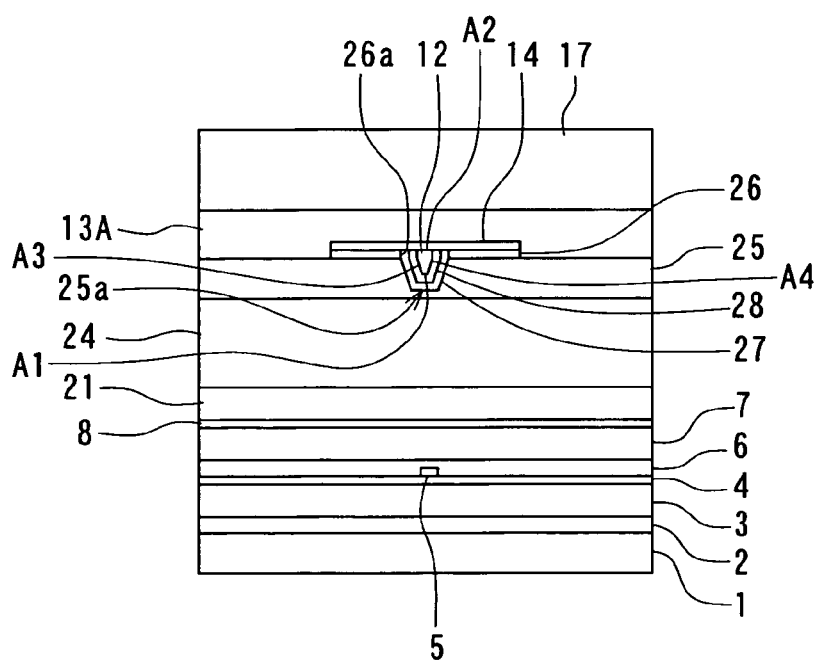
FIG. 3 is a front view of the medium facing surface of the magnetic head of the first embodiment of the invention.
Figure 4:
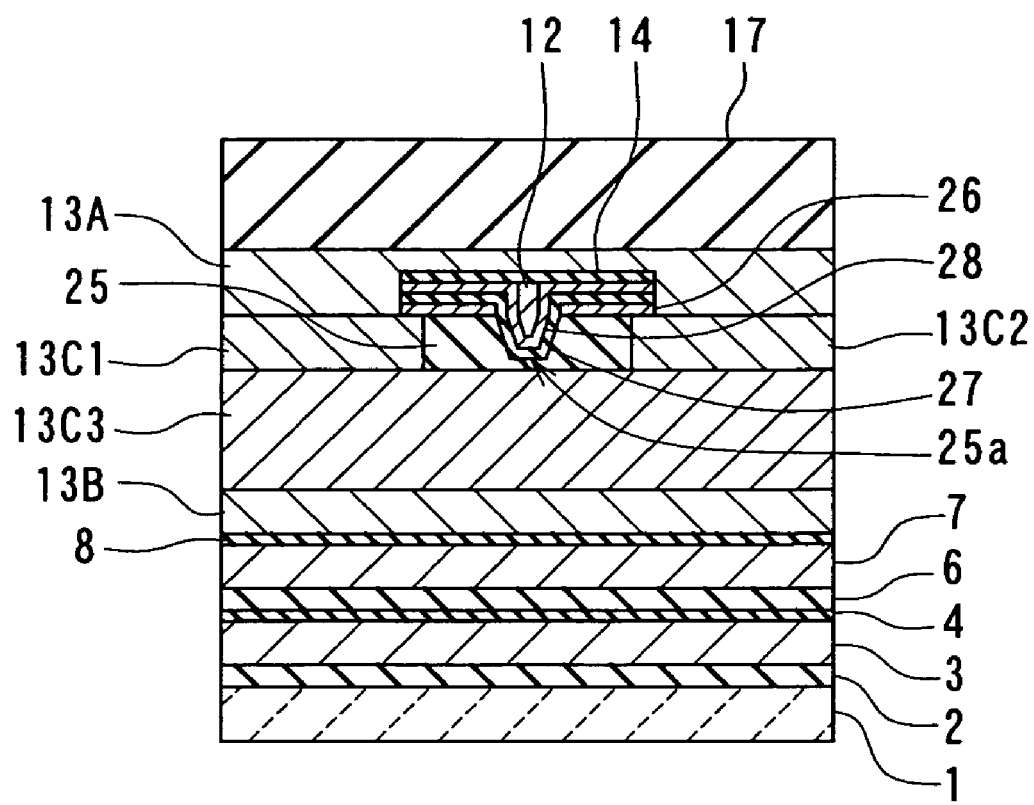
FIG. 4 is a cross-sectional view taken along line 4-4 of FIG. 2.
Figure 5:
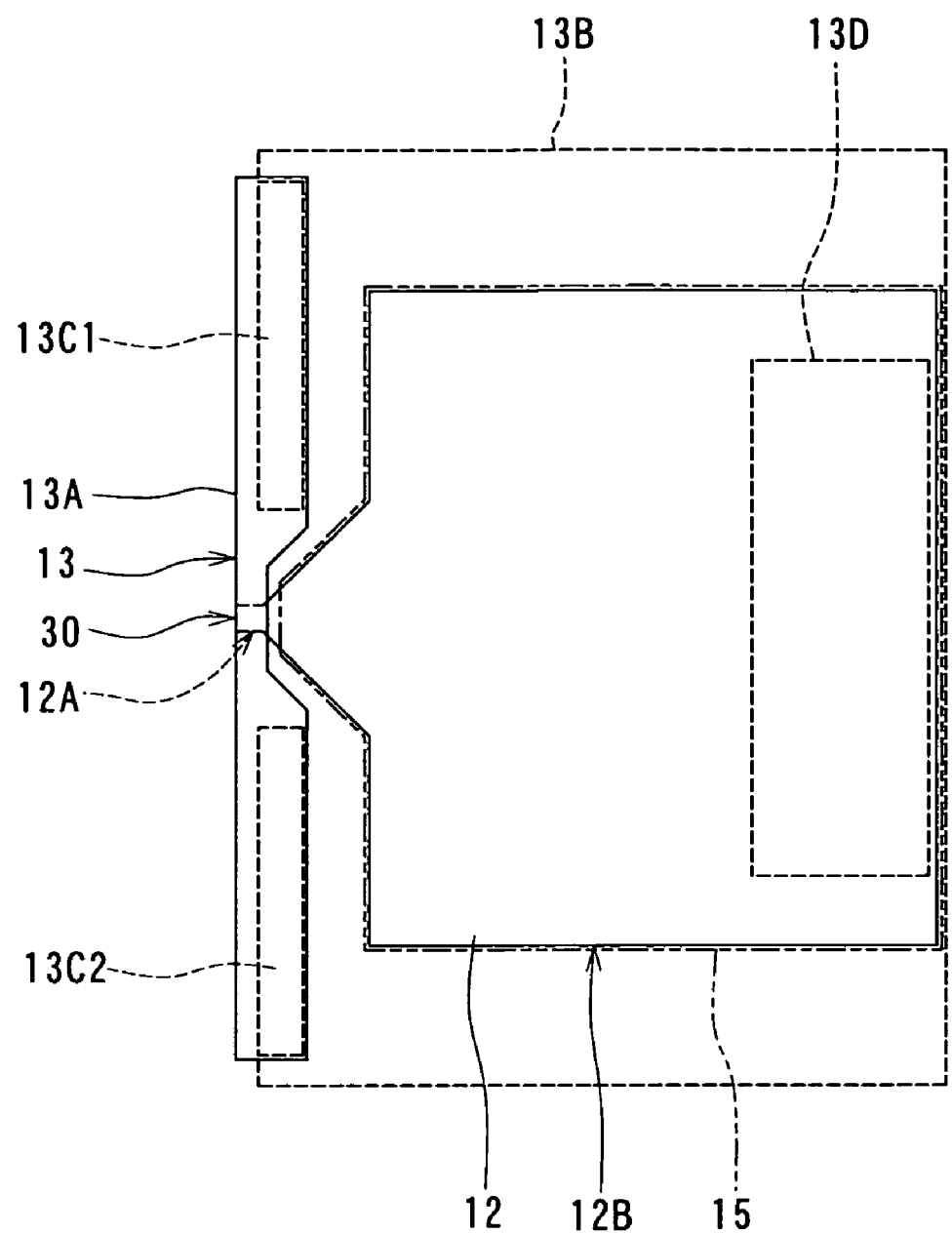
FIG. 5 is a top view for illustrating the pole layer and the shield of the magnetic head of the first embodiment of the invention.

Preferred embodiments of the invention will now be described in detail with reference to the accompanying drawings. Reference is now made to FIG. 1 to FIG. 5 to describe the configuration of a magnetic head for perpendicular magnetic recording of a first embodiment of the invention. FIG. 1 is a perspective view illustrating a portion of the magnetic head of the first embodiment in a neighborhood of the medium facing surface. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium. FIG. 3 is a front view of the medium facing surface of the magnetic head of the embodiment. FIG. 4 is a cross-sectional view taken along line 4-4 of FIG. 2. FIG. 5 is a top view for illustrating a pole layer and a shield of the magnetic head of the embodiment.

As shown in FIG. 2 to FIG. 4, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The portions from the bottom shield layer 3 to the top shield layer 7 make up a read head. The magnetic head further comprises a nonmagnetic layer 8 made of a nonmagnetic material and disposed on the top shield layer 7, and a write head disposed on the nonmagnetic layer 8. The nonmagnetic layer 8 is made of alumina, for example. The write head comprises a coil 11, a pole layer 12, a shield 13 and a gap layer 14.

The coil 11 generates a magnetic field corresponding to data to be written on the recording medium. The pole layer 12 has an end face located in the medium facing surface 30. The pole layer 12 allows the magnetic flux corresponding to the field generated by the coil 11 to pass therethrough and generates a write magnetic field for writing the data on the medium by means of the perpendicular magnetic recording system.

The shield 13 incorporates: a first layer 13A having an end face located in a region of the medium facing surface 30 forward of the end face of the pole layer 12 along the direction T of travel of the recording medium; a second layer 13B disposed in a region sandwiching the pole layer 12 with the first layer 13A; a first coupling portion 13C coupling the first layer 13A to the second layer 13B without touching the pole layer 12; and a second coupling portion 13D located farther from the medium facing surface 30 than the first coupling portion 13C and coupling the pole layer 12 to the second layer 13B. Each of the first layer 13A, the second layer 13B, the first coupling portion 13C and the second coupling portion 13D is made of a magnetic material. Such a material may be any of CoFeN, CoNiFe, NiFe and CoFe, for example.

The second layer 13B is disposed on the nonmagnetic layer 8. The second layer 13B has an end face closer to the medium facing surface 30. This end face is located at a distance from the medium facing surface 30. The magnetic head further comprises: an insulating layer 21 made of an insulating material and disposed around the second layer 13B on the nonmagnetic layer 8. The insulating layer 21 is made of alumina, for example.

The first coupling portion 13C is disposed on a region of the second layer 13B near the medium facing surface 30. The first coupling portion 13C has an end face closer to the medium facing surface 30. This end face is located at a distance from the medium facing surface 30. The second coupling portion 13D is disposed on a region of the second layer 13B farther from the medium facing surface 30 than the first coupling portion 13C.

The first coupling portion 13C has a first portion 13C1, a second portion 13C2 and a third portion 13C3. The first portion 13C1 and the second portion 13C2 are connected to the first layer 13A and disposed on both sides of the pole layer 12 opposed to each other in the direction of track width. The third portion 13C3 is disposed between the medium facing surface 30 and part of the coil 11, and couples the second layer 13B to each of the first portion 13C1 and the second portion 13C2. The first coupling portion 13C having the first to third portions 13C1, 13C2 and 13C3 couples the first layer 13A to the second layer 13B at positions on both sides of the pole layer 12 opposed to each other in the direction of track width. The third portion 13C3 is disposed on the second layer 13B. The first portion 13C1 and the second portion 13C2 are disposed on the third portion 13C3.

The magnetic head further comprises an insulating layer 22 made of an insulating material and disposed on the second layer 13B. The coil 11 is disposed on the insulating layer 22. The coil 11 is flat-whorl-shaped and wound around the second coupling portion 13D. The magnetic head further comprises: an insulating layer 23 made of an insulating material and disposed around the coil 11 and in the space between the respective adjacent turns of the coil 11; and an insulating layer 24 disposed around the insulating layer 23, the third portion 13C3 and the second coupling portion 13D. The third portion 13C3, the second coupling portion 13D, the coil 11, and the insulating layers 23 and 24 have flattened top surfaces. The insulating layers 22 and 24 are made of alumina, for example. The insulating layer 23 is made of photoresist, for example. The coil 11 is made of a conductive material such as copper.

The magnetic head further comprises an encasing layer 25 made of a nonmagnetic material and disposed on the flattened top surfaces of the third portion 13C3, the second coupling portion 13D, the coil 11, and the insulating layers 23 and 24. The encasing layer 25 has a groove 25a that opens in the top surface thereof and that accommodates at least part of the pole layer 12. The bottom of the groove 25a has a contact hole formed to a level of the top surface of the second coupling portion 13D. The encasing layer 25 may be made of an insulating material such as alumina, silicon oxynitride (SiON) or silicon oxide ($SiO_x$), or a nonmagnetic metal material such as Ru, Ta, Mo, Ti, W, NiCu, NiB or NiPd.

The magnetic head further comprises a nonmagnetic metal layer 26 made of a nonmagnetic metal material and disposed on the top surface of the encasing layer 25. The nonmagnetic metal layer 26 has an opening 26a that penetrates, and the edge of the opening 26a is located directly above the edge of the groove 25a in the top surface of the encasing layer 25. The nonmagnetic metal layer 26 may be made of any of Ta, Mo, W, Ti, Ru, Rh, Re, Pt, Pd, Ir, NiCr, NiP, NiPd, NiB, AlCu, $WSi_2$, $TaSi_2$, $TiSi_2$, TiN, and TiW, for example.

The magnetic head further comprises a nonmagnetic film 27 and a polishing stopper layer 28 that are disposed in the groove 25a of the encasing layer 25 and in the opening 26a of the nonmagnetic metal layer 26. The nonmagnetic film 27 is disposed to touch the surface of the groove 25a. The pole layer 12 is disposed apart from the surface of the groove 25a. The polishing stopper layer 28 is disposed between the nonmagnetic film 27 and the pole layer 12. The polishing stopper layer 28 also functions as an electrode layer (a seed layer) used for forming the pole layer 12 by plating. The nonmagnetic film 27 and the polishing stopper layer 28 have contact holes, too, that are formed to the level of the top surface of the second coupling portion 13D. The pole layer 12 is thus connected to the second coupling portion 13D through the contact holes formed in the groove 25a, the nonmagnetic film 27 and the polishing stopper layer 28.

The nonmagnetic film 27 is made of a nonmagnetic material. The material of the nonmagnetic film 27 may be an insulating material, a semiconductor material or a conductive material. The insulating material as the material of the nonmagnetic film 27 may be any of alumina, silicon oxide ($SiO_x$), and silicon oxynitride (SiON). The semiconductor material as the material of the nonmagnetic film 27 may be polycrystalline silicon or amorphous silicon. The conductive material as the material of the nonmagnetic film 27 may be the same as that of the nonmagnetic metal layer 26.

The polishing stopper layer 28 is made of a nonmagnetic material. The material of the polishing stopper layer 28 may be a nonmagnetic conductive material or an insulating material. The nonmagnetic conductive material as the material of the polishing stopper layer 28 may be the same as that of the nonmagnetic metal layer 26. The insulating material as the material of the polishing stopper layer 28 may be silicon oxide. If the polishing stopper layer 28 is made of a nonmagnetic conductive material, the polishing stopper layer 28 corresponds to the nonmagnetic conductive layer of the invention.

The pole layer 12 is made of a magnetic metal material. The pole layer 12 may be made of any of NiFe, CoNiFe and CoFe, for example.

The gap layer 14 is disposed on a region of the pole layer 12 near the medium facing surface 30. The gap layer 14 is made of a nonmagnetic material. The material of the gap layer 14 may be an insulating material such as alumina or a nonmagnetic conductive material such as Ru, NiCu, Ta, W, NiB or NiPd. The first layer 13A of the shield 13 is disposed on the gap layer 14.

In the medium facing surface 30, the end face of the first layer 13A is located at a specific distance created by the thickness of the gap layer 14 from the end face of the pole layer 12. The gap layer 14 preferably has a thickness that falls within a range of 5 to 60 nm inclusive, and that may fall within a range of 30 to 60 nm inclusive, for example. The end face of the pole layer 12 has a side adjacent to the gap layer 14, and this side defines the track width. Part of the coil 11 passes through the space surrounded by the pole layer 12, the second layer 13B, the first coupling portion 13C and the second coupling portion 13D.

The magnetic head further comprises: a yoke layer 15 disposed on a region of the pole layer 12 apart from the medium facing surface 30; and a nonmagnetic layer 16 made of a nonmagnetic material and disposed around the first layer 13A and the yoke layer 15. The nonmagnetic layer 16 is made of alumina, for example. The first layer 13A, the yoke layer 15 and the nonmagnetic layer 16 have flattened top surfaces.

The magnetic head further comprises a protection layer 17 made of a nonmagnetic material and disposed on the top surfaces of the first layer 13A, the yoke layer 15 and the nonmagnetic layer 16. The protection layer 17 is made of an inorganic insulating material such as alumina.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 11, the pole layer 12, the shield 13 and the gap layer 14.

The pole layer 12 is disposed in the groove 25a of the encasing layer 25 and in the opening 26a of the nonmagnetic metal layer 26 with the nonmagnetic film 27 and the polishing stopper layer 28 disposed between the pole layer 12 and each of the groove 25a and the opening 26a. The nonmagnetic film 27 has a thickness that falls within a range of 10 to 40 nm inclusive, for example. However, the thickness of the nonmagnetic film 27 is not limited to this range but may be of any other value, depending on the track width. The polishing stopper layer 28 has a thickness that falls within a range of 30 to 100 nm inclusive, for example.

The pole layer 12 incorporates: a first portion having the end face located in the medium facing surface 30; and a second portion having a thickness greater than that of the first portion and disposed farther from the medium facing surface 30 than the first portion. The thickness of the first portion does not change according to the distance from the medium facing surface 30. The top surface of the first portion is located closer to the substrate 1 than the top surface of the second portion. As a result, the top surface of the pole layer 12 that touches the gap layer 14 bends. The difference in level created between the top surfaces of the first portion and the second portion falls within a range of 0.1 to 0.3 µm inclusive, for example. The thickness of the first portion falls within a range of 0.03 to 0.3 µm inclusive, for example.

The shield 13 incorporates: the first layer 13A having the end face located in a region of the medium facing surface 30 forward of the end face of the pole layer 12 along the direction T of travel of the recording medium; the second layer 13B disposed in a region sandwiching the pole layer 12 with the first layer 13A; the first coupling portion 13C coupling the first layer 13A to the second layer 13B without touching the pole layer 12; and the second coupling portion 13D located farther from the medium facing surface 30 than the first coupling portion 13C and coupling the pole layer 12 to the second layer 13B.

The first coupling portion 13C has the first portion 13C1, the second portion 13C2 and the third portion 13C3. The first portion 13C1 and the second portion 13C2 are connected to the first layer 13A and disposed on both sides of the pole layer 12 opposed to each other in the direction of track width. The third portion 13C3 is disposed between the medium facing surface 30 and a portion of the coil 11, and couples the second layer 13B to each of the first portion 13C1 and the second portion 13C2.

The first layer 13A has a thickness that falls within a range of 0.2 to 0.6 µm inclusive, for example. The second layer 13B has a thickness that falls within a range of 0.5 to 1.5 µm inclusive, for example. Each of the first portion 13C1 and the second portion 13C2 has a thickness that falls within a range of 0.2 to 0.5 µm inclusive, for example. The third portion 13C3 has a thickness that falls within a range of 0.8 to 3.0 µm inclusive, for example. The second coupling portion 13D has a thickness that falls within a range of 0.8 to 3.0 µm inclusive, for example.

Each of the second layer 13B and the first coupling portion 13C has an end face located closer to the medium facing surface 30, the end face being located at a distance from the medium facing surface 30. The distance between the medium facing surface 30 and each of the end face of the second layer 13B and the end face of the first coupling portion 13C is 0.1 to 0.8 µm, for example.

The bottom surface of the first layer 13A bends to be opposed to the top surface of the pole layer 12 with the gap layer 14 disposed in between. The gap layer 14 also bends along the top surface of the pole layer 12. The width of the end face of the first layer 13A located in the medium facing surface 30 is equal to or greater than the track width.

Reference is now made to FIG. 1 and FIG. 5 to describe the shape of the pole layer 12 in detail. As shown in FIG. 5, the pole layer 12 incorporates a track width defining portion 12A and a wide portion 12B. The track width defining portion 12A has the end face located in the medium facing surface 30. The wide portion 12B is located farther from the medium facing surface 30 than the track width defining portion 12A and has a width greater than the width of the track width defining portion 12A. The width of the track width defining portion 12A does not change in accordance with the distance from the medium facing surface 30. The wide portion 12B is equal in width to the track width defining portion 12A at the boundary with the track width defining portion 12A, and gradually increases in width as the distance from the medium facing surface 30 increases and then maintains a specific width to the end of the wide portion 12B. In the embodiment, the track width defining portion 12A is a portion of the pole layer 12 extending from the end face located in the medium facing surface 30 to the point at which the width of the pole layer 12 starts to increase. Here, the length of the track width defining portion 12A taken in the direction orthogonal to the medium facing surface 30 is called a neck height. The neck height falls within a range of 0.05 to 0.3 µm inclusive, for example.

As shown in FIG. 3, the end face of the pole layer 12 located in the medium facing surface 30 has: a first side A1 closest to the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The width of the end face of the pole layer 12 located in the medium facing surface 30 decreases as the distance from the first side A1 decreases. Each of the third side A3 and the fourth side A4 forms an angle that falls within a range of 5 to 15 degrees inclusive, for example, with respect to the direction orthogonal to the top surface of the substrate 1. The length of the second side A2, that is, the track width, falls within a range of 0.05 to 0.20 µm inclusive, for example.

Throat height TH is the distance between the medium facing surface 30 and one of two points that is closer to the medium facing surface 30, wherein one of the two points is the one at which the space between the pole layer 12 and the first layer 13A starts to increase when seen from the medium facing surface 30, and the other of the points is the one at which the gap layer 14 first bends when seen from the medium facing surface 30. In the embodiment, as shown in FIG. 2, the throat height TH is the distance between the medium facing surface 30 and the point at which the gap layer 14 first bends when seen from the medium facing surface 30. The throat height TH falls within a range of 0.05 to 0.3 µm inclusive, for example.

Reference is now made to FIG. 6A to FIG. 17A, FIG. 6B to FIG. 17B, and FIG. 6C to FIG. 17C to describe a method of manufacturing the magnetic head of the embodiment. FIG. 6A to FIG. 17A, FIG. 6B to FIG. 17B, and FIG. 6C to FIG. 17C illustrate layered structures obtained in manufacturing process of the magnetic head. The portions closer to the substrate 1 than the top shield layer 7 are omitted in FIG. 6A to FIG. 17A, FIG. 6B to FIG. 17B, and FIG. 6C to FIG. 17C. According to the method of manufacturing the magnetic head of the embodiment, as shown in FIG. 2 to FIG. 4, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7 is formed on the top shield gap film 6.

Figure 6A:
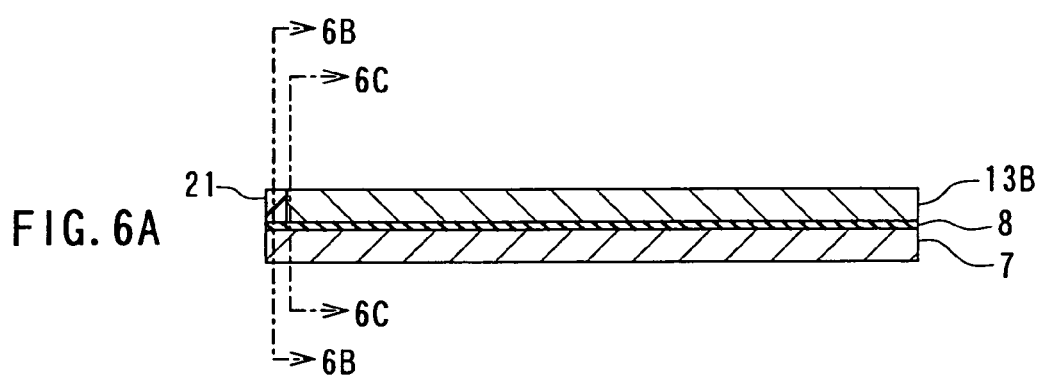
FIG. 6A to FIG. 6C are views for illustrating a step of a method of manufacturing the magnetic head of the first embodiment of the invention.
Figure 6B:
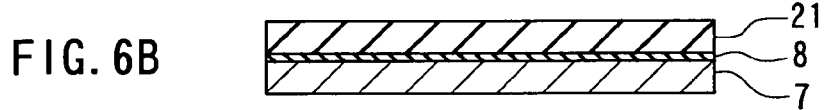
Figure 6C:
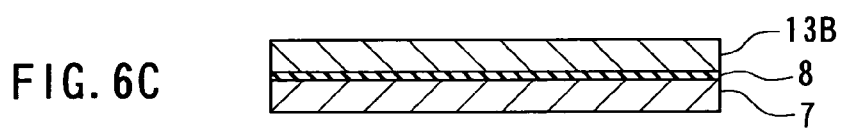

FIG. 6A to FIG. 6C illustrate the following step. FIG. 6A shows a cross section of a layered structure obtained in the manufacturing process of the magnetic head, the cross section being orthogonal to the medium facing surface and the substrate. FIG. 6B shows a cross section of the layered structure taken along line 6B-6B of FIG. 6A. FIG. 6C shows a cross section of the layered structure taken along line 6C-6C of FIG. 6A.

In the step, first, the nonmagnetic layer 8 is formed on the top shield layer 7 by sputtering, for example. Next, the second layer 13B is formed on the nonmagnetic layer 8 by frame plating, for example. Next, the insulating layer 21 is formed on the entire top surface of the layered structure. The insulating layer 21 is then polished by chemical mechanical polishing (hereinafter referred to as CMP), for example, so that the second layer 13B is exposed.

Figure 7A:
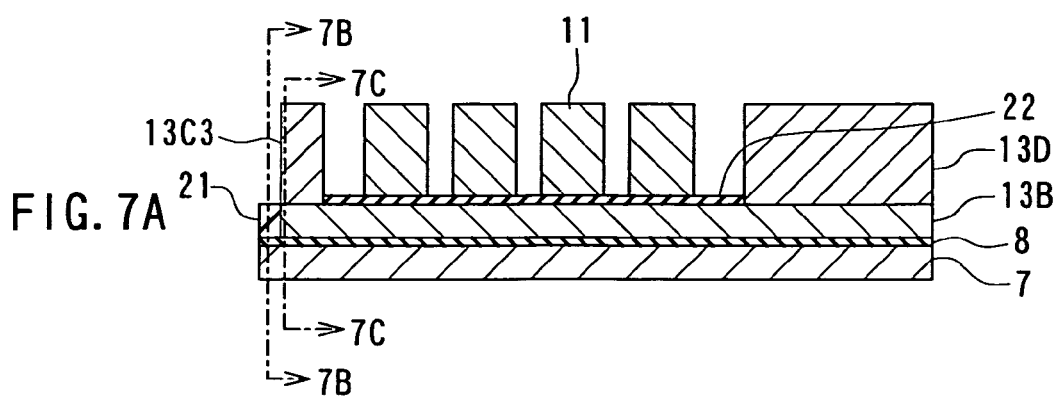
FIG. 7A to FIG. 7C are views for illustrating a step that follows the step shown in FIG. 6A to FIG. 6C.
Figure 7B:
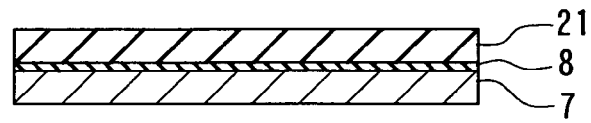
Figure 7C:
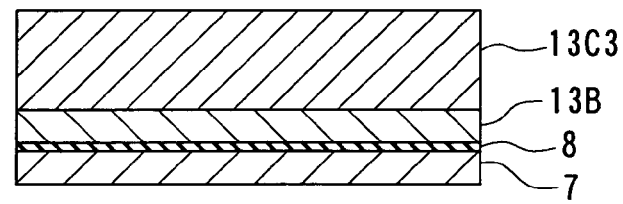

FIG. 7A to FIG. 7C illustrate the following step. FIG. 7A shows a cross section of a layered structure obtained in the manufacturing process of the magnetic head, the cross section being orthogonal to the medium facing surface and the substrate. FIG. 7B shows a cross section of the layered structure taken along line 7B-7B of FIG. 7A. FIG. 7C shows a cross section of the layered structure taken along line 7C-7C of FIG. 7A.

In the step, first, the insulating layer 22 is formed on regions of the top surfaces of the second layer 13B and the insulating layer 21 where the coil 11 is to be disposed. Next, the coil 11 is formed on the insulating layer 22 by frame plating, for example. Next, the third portion 13C3 and the second coupling portion 13D are formed by frame plating, for example. Alternatively, the coil 11 may be formed after the third portion 13C3 and the second coupling portion 13D are formed.

Figure 8A:
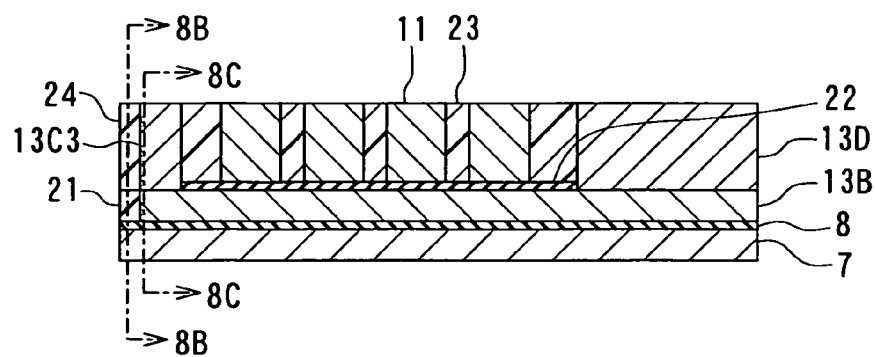
FIG. 8A to FIG. 8C are views for illustrating a step that follows the step shown in FIG. 7A to FIG. 7C.
Figure 8B:
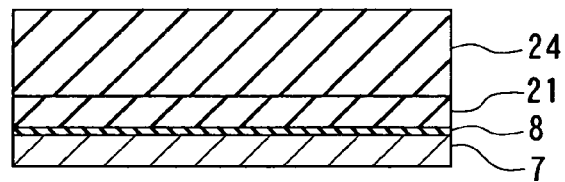
Figure 8C:
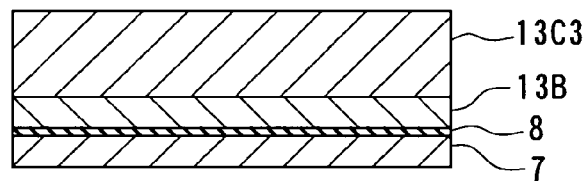

FIG. 8A to FIG. 8C illustrate the following step. FIG. 8A shows a cross section of a layered structure obtained in the manufacturing process of the magnetic head, the cross section being orthogonal to the medium facing surface and the substrate. FIG. 8B shows a cross section of the layered structure taken along line 8B-8B of FIG. 8A. FIG. 8C shows a cross section of the layered structure taken along line 8C-8C of FIG. 8A.

In the step, first, the insulating layer 23 made of photoresist, for example, is selectively formed around the coil 11 and in the space between the respective adjacent turns of the coil 11. Next, the insulating layer 24 having a thickness of 3 to 4 µm, for example, is formed by a method such as sputtering on the entire top surface of the layered structure. Next, the insulating layer 24 is polished by CMP, for example, so that the third portion 13C3, the second coupling portion 13D and the coil 11 are exposed, and the top surfaces of the third portion 13C3, the second coupling portion 13D, the coil 11, and the insulating layers 23 and 24 are thereby flattened.

Figure 9A:
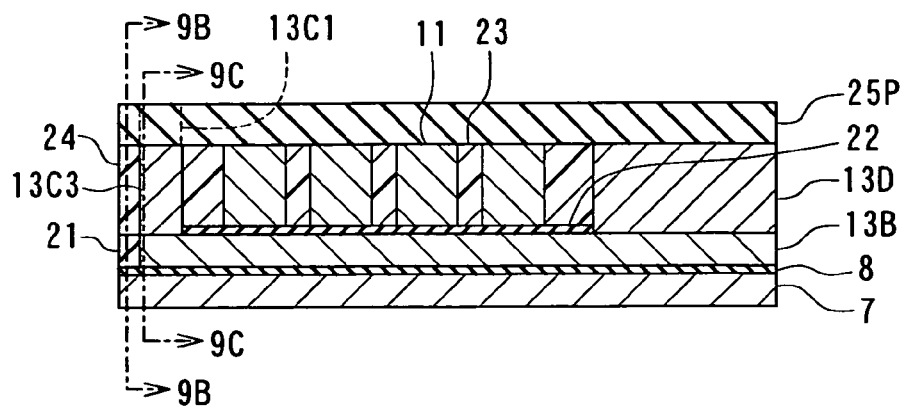
FIG. 9A to FIG. 9C are views for illustrating a step that follows the step shown in FIG. 8A to FIG. 8C.
Figure 9B:
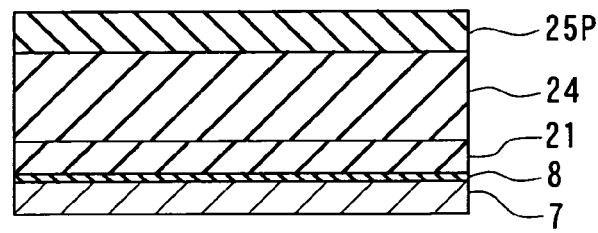
Figure 9C:
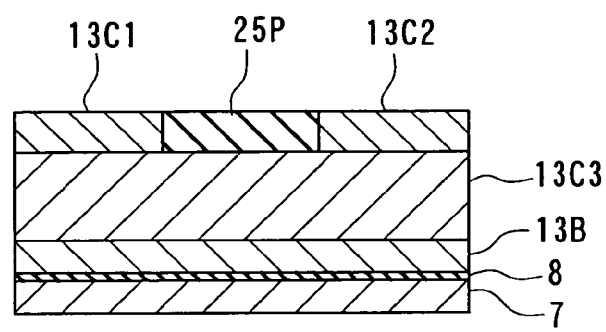

FIG. 9A to FIG. 9C illustrate the following step. FIG. 9A shows a cross section of a layered structure obtained in the manufacturing process of the magnetic head, the cross section being orthogonal to the medium facing surface and the substrate. FIG. 9B shows a cross section of the layered structure taken along line 9B-9B of FIG. 9A. FIG. 9C shows a cross section of the layered structure taken along line 9C-9C of FIG. 9A.

In the step, first, the first portion 13C1 and the second portion 13C2 are formed on the third portion 13C2 by frame plating, for example. Next, a nonmagnetic layer 25P is formed by sputtering, for example, on the entire top surface of the layered structure. The groove 25a will be formed in the nonmagnetic layer 25P and the nonmagnetic layer 25P will be thereby formed into the encasing layer 25 later. Next, the nonmagnetic layer 25P is polished so that the first portion 13C1 and the second portion 13C2 are exposed, and the top surfaces of the first portion 13C1, the second portion 13C2 and the nonmagnetic layer 25P are thereby flattened.

Figure 10A:
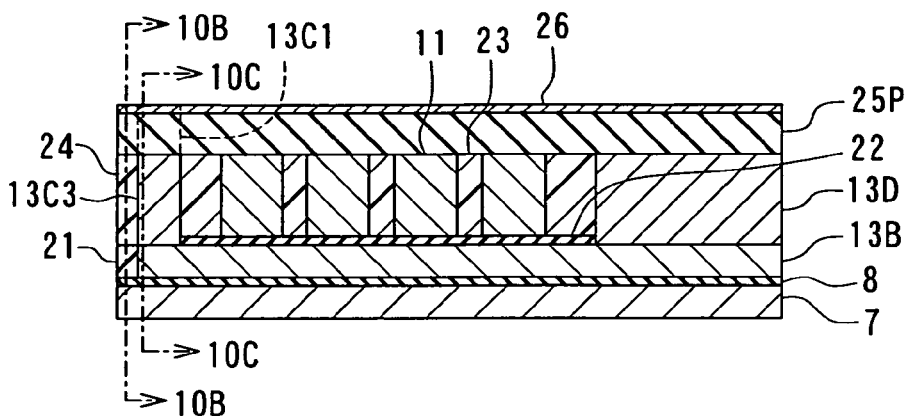
FIG. 10A to FIG. 10C are views for illustrating a step that follows the step shown in FIG. 9A to FIG. 9C.
Figure 10B:
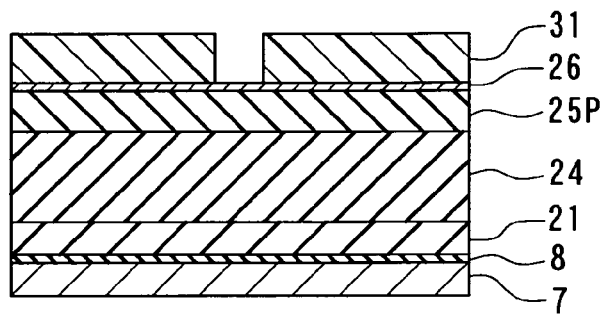
Figure 10C:
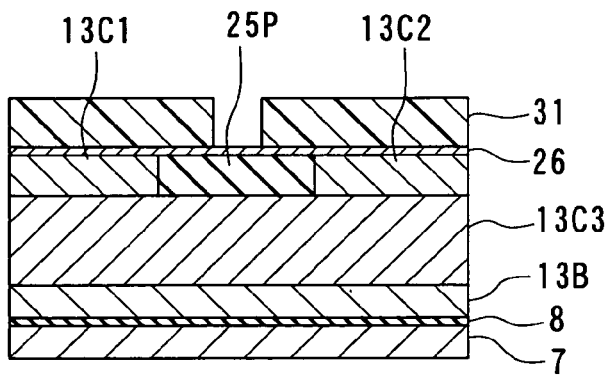

FIG. 10A to FIG. 10C illustrate the following step. FIG. 10A shows a cross section of a layered structure obtained in the manufacturing process of the magnetic head, the cross section being orthogonal to the medium facing surface and the substrate. FIG. 10B shows a cross section of the layered structure taken along line 10B-10B of FIG. 10A. FIG. 10C shows a cross section of the layered structure taken along line 10C-10C of FIG. 10A.

In the step, first, the nonmagnetic metal layer 26 is formed by sputtering, for example, on the first portion 13C1, the second portion 13C2 and the nonmagnetic layer 25P. The nonmagnetic metal layer 26 has a thickness that falls within a range of 40 to 100 nm inclusive, for example. Next, a photoresist layer having a thickness of 1.0 µm, for example, is formed on the nonmagnetic metal layer 26. The photoresist layer is then patterned to form a mask 31 for making the groove 25a of the encasing layer 25. The mask 31 has an opening having a shape corresponding to the groove 25a.

Figure 11A:
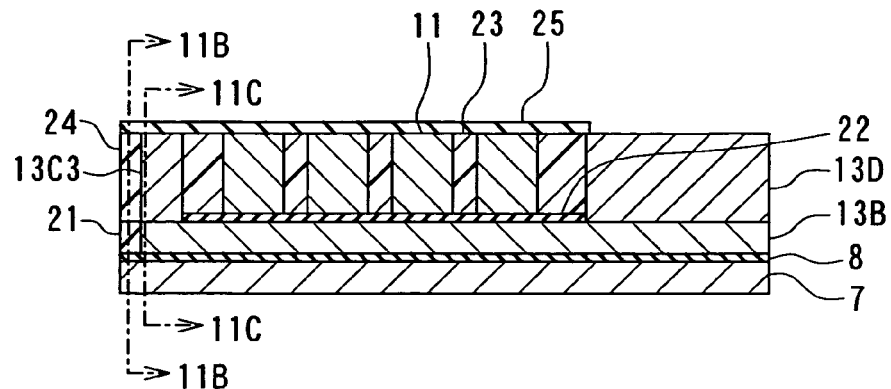
FIG. 11A to FIG. 11C are views for illustrating a step that follows the step shown in FIG. 10A to FIG. 10C.
Figure 11B:
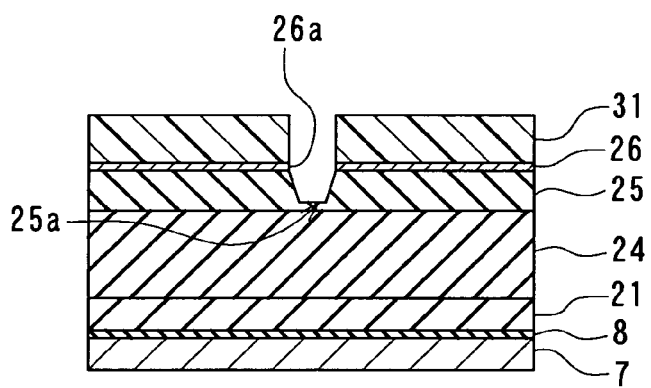
Figure 11C:
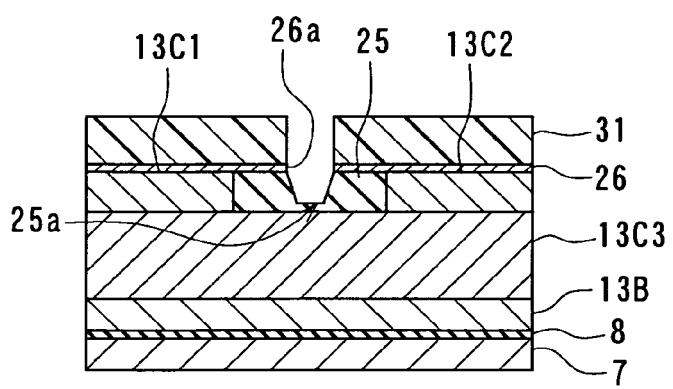

FIG. 11A to FIG. 11C illustrate the following step. FIG. 11A shows a cross section of a layered structure obtained in the manufacturing process of the magnetic head, the cross section being orthogonal to the medium facing surface and the substrate. FIG. 11B shows a cross section of the layered structure taken along line 11B-11B of FIG. 11A. FIG. 11C shows a cross section of the layered structure taken along line 11C-11C of FIG. 11A.

In the step, first, the nonmagnetic metal layer 26 is selectively etched, using the mask 31. The opening 26a that penetrates is thereby formed in the nonmagnetic metal layer 26. The opening 26a has a shape corresponding to the plane geometry of the pole layer 12 to be formed later. Furthermore, a portion of the nonmagnetic layer 25P exposed from the opening 26a of the nonmagnetic metal layer 26 is selectively etched so as to form the groove 25a in the nonmagnetic layer 25P. Furthermore, a portion of the nonmagnetic layer 25P located on the second coupling potion 13D is selectively etched so as to form a contact hole at the bottom of the groove 25a. The mask 31 is then removed. The nonmagnetic layer 25P is formed into the encasing layer 25 by forming the groove 25a therein. The edge of the opening 26a of the nonmagnetic metal layer 26 is located directly above the edge of the groove 25a located in the top surface of the encasing layer 25.

The etching of the nonmagnetic metal layer 26 and the nonmagnetic layer 25P is performed by reactive ion etching or ion beam etching, for example. The etching for forming the groove 25a in the nonmagnetic layer 25P is performed such that the walls of the groove 25a corresponding to both sides of the track width defining portion 12A of the pole layer 12 each form an angle that falls within a range of 5 to 15 degrees inclusive, for example, with respect to the direction orthogonal to the top surface of the substrate 1.

Figure 12A:
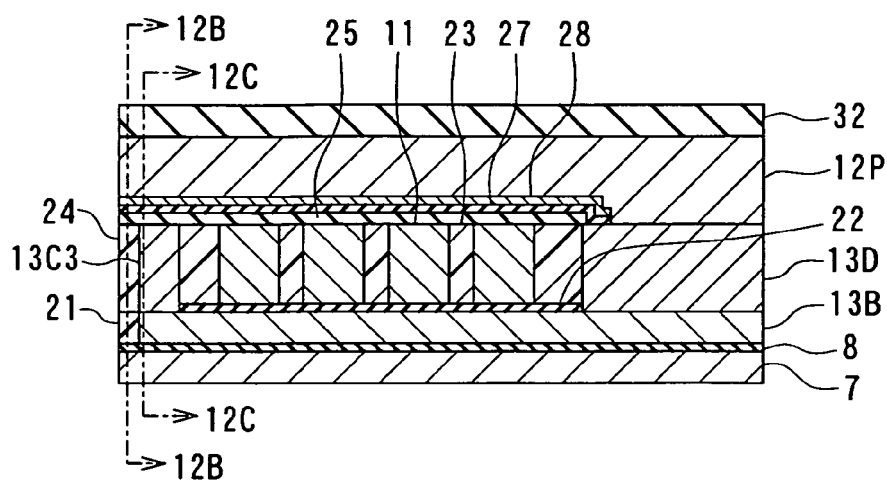
FIG. 12A to FIG. 12C are views for illustrating a step that follows the step shown in FIG. 11A to FIG. 11C.
Figure 12B:
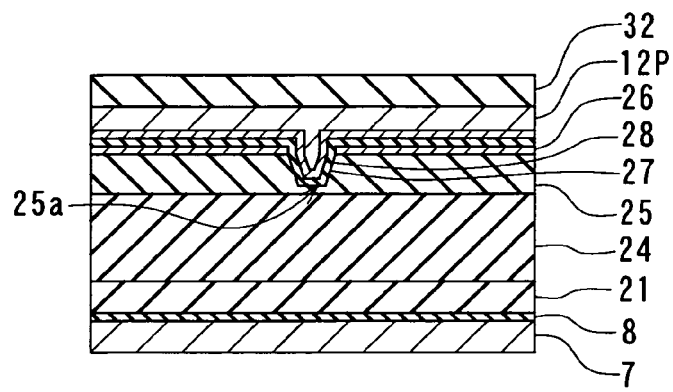
Figure 12C:
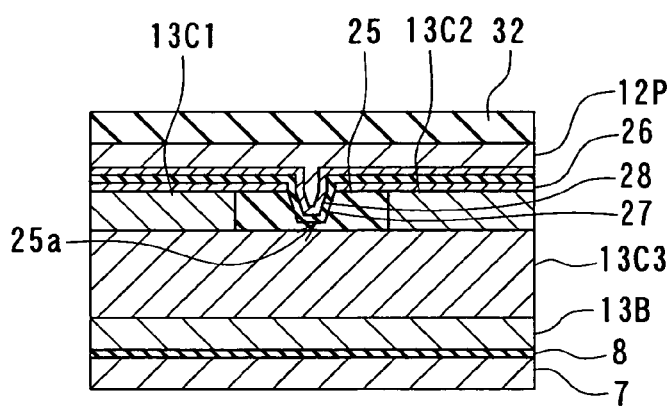

FIG. 12A to FIG. 12C illustrate the following step. FIG. 12A shows a cross section of a layered structure obtained in the manufacturing process of the magnetic head, the cross section being orthogonal to the medium facing surface and the substrate. FIG. 12B shows a cross section of the layered structure taken along line 12B-12B of FIG. 12A. FIG. 12C shows a cross section of the layered structure taken along line 12C-12C of FIG. 12A.

In the step, first, the nonmagnetic film 27 is formed on the entire top surface of the layered structure. The nonmagnetic film 27 is formed in the groove 25a of the encasing layer 25, too. The nonmagnetic film 27 is formed by sputtering or chemical vapor deposition (hereinafter referred to as CVD), for example. It is possible to control the thickness of the nonmagnetic film 27 with precision. It is thereby possible to control the track width with accuracy. If the nonmagnetic film 27 is formed by CVD, it is preferred to employ a method called 'atomic layer CVD' (ALCVD) in which formation of a single atomic layer is repeated. In this case, it is possible to control the thickness of the nonmagnetic film 27 with higher precision. When ALCVD is employed to form the nonmagnetic film 27, it is preferred to use alumina, among insulating materials and Ta or Ru among conductive materials as the material of the nonmagnetic film 27. If a semiconductor material is selected as the material of the nonmagnetic film 27, it is preferred to form the nonmagnetic film 27 by ALCVD at a low temperature (around 200° C.) or by low-pressure CVD at a low temperature. The semiconductor material as the material of the nonmagnetic film 27 is preferably undoped polycrystalline silicon or amorphous silicon.

Next, the polishing stopper layer 28 is formed on the entire top surface of the layered structure. The polishing stopper layer 28 is formed in the groove 25a of the encasing layer 25, too. The polishing stopper layer 28 indicates the level at which polishing of the polishing step to be performed later is stopped. If the nonmagnetic film 27 is made of a conductive material, it is possible to make the nonmagnetic film 27 function as the polishing stopper layer 28, too, without providing the polishing stopper layer 28. In this case, the nonmagnetic film 27 corresponds to the nonmagnetic conductive layer of the invention.

If a nonmagnetic conductive material is used as the material of the polishing stopper layer 28, the polishing stopper layer 28 is formed by sputtering or CVD, for example. If the polishing stopper layer 28 is formed by CVD, it is preferred to employ ALCVD. If the polishing stopper layer 28 made of a nonmagnetic conductive material is formed by ALCVD, Ta or Ru is preferred as the material of the polishing stopper layer 28. The polishing stopper layer 28 formed by ALCVD exhibits a good step coverage. Therefore, it is possible to form the polishing stopper layer 28 that is uniform in the groove 25a of the encasing layer 25 by employing ALCVD to form the polishing stopper layer 28. It is thereby possible to control the track width with accuracy. If the polishing stopper layer 28 is formed by ALCVD, the nonmagnetic film 27 for controlling the track width may be omitted.

If the polishing stopper layer 28 made of a nonmagnetic conductive material is formed by ALCVD, it is possible to reduce the resistance of the electrode layer (seed layer) used for forming the pole layer 12 by plating. It is thereby possible to form the pole layer 12 having a precise thickness.

Next, portions of the nonmagnetic film 27 and the polishing stopper layer 28 located on the second coupling portion 13D are selectively etched to form the contact holes in the nonmagnetic film 27 and the polishing stopper layer 28.

Next, a magnetic layer 12P that will be the pole layer 12 later is formed on the entire top surface of the layered structure. The magnetic layer 12P is formed by the following method, for example. First, an electrode film to be a portion of an electrode layer (seed layer) for plating is formed on the entire top surface of the layered structure. The electrode film is made of a magnetic material and will be a portion of the pole layer 12 later. The electrode film is formed by sputtering or ion beam deposition (hereinafter referred to as IBD), for example. If the electrode film is formed by sputtering, it is preferred to employ collimation sputtering or long throw sputtering. Alternatively, the polishing stopper layer 28 may be used as an electrode layer (seed layer) for plating instead of forming the electrode film made of a magnetic material. Next, a plating layer is formed on the electrode film by frame plating, for example. The plating layer has a thickness of 0.5 to 1.0 µm, for example. The plating layer is made of a magnetic material and will be a major portion of the pole layer 12 later. The plating layer is formed such that the top surface thereof is located higher than the top surfaces of the nonmagnetic metal layer 26, the nonmagnetic film 27 and the polishing stopper layer 28.

Next, a coating layer 32 made of alumina, for example, and having a thickness of 0.5 to 1.2 µm, for example, is formed by a method such as sputtering on the entire top surface of the layered structure.

Figure 13A:
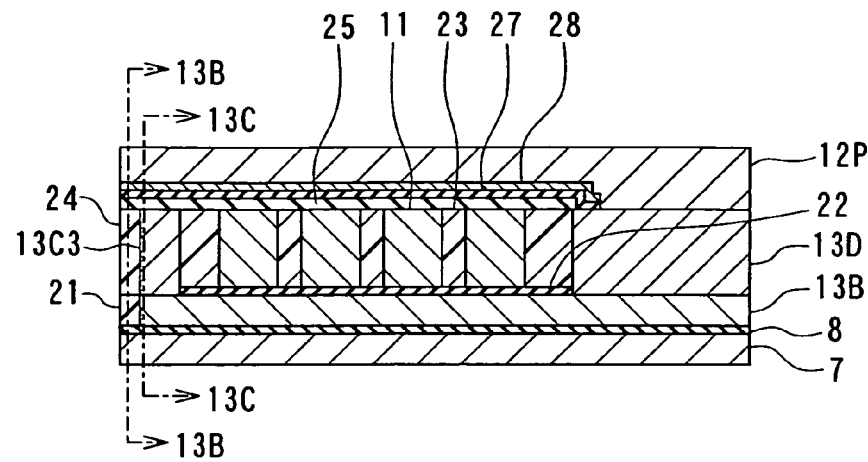
FIG. 13A to FIG. 13C are views for illustrating a step that follows the step shown in FIG. 12A to FIG. 12C.
Figure 13B:
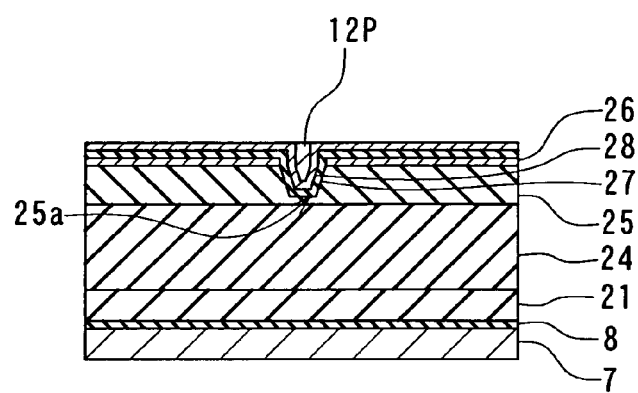
Figure 13C:
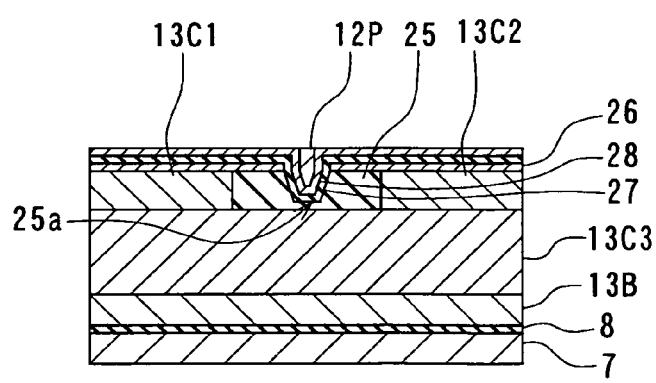

FIG. 13A to FIG. 13C illustrate the following step. FIG. 13A shows a cross section of a layered structure obtained in the manufacturing process of the magnetic head, the cross section being orthogonal to the medium facing surface and the substrate. FIG. 13B shows a cross section of the layered structure taken along line 13B-13B of FIG. 13A. FIG. 13C shows a cross section of the layered structure taken along line 13C-13C of FIG. 13A.

In the step, first, the coating layer 32 and the magnetic layer 12P are polished by CMP, for example, so that the polishing stopper layer 28 is exposed, and the top surfaces of the polishing stopper layer 28 and the magnetic layer 12P are thereby flattened. If the coating layer 32 and the magnetic layer 12P are polished by CMP, such a slurry is used that polishing is stopped when the polishing stopper layer 28 is exposed, such as an alumina-base slurry.

Figure 14A:
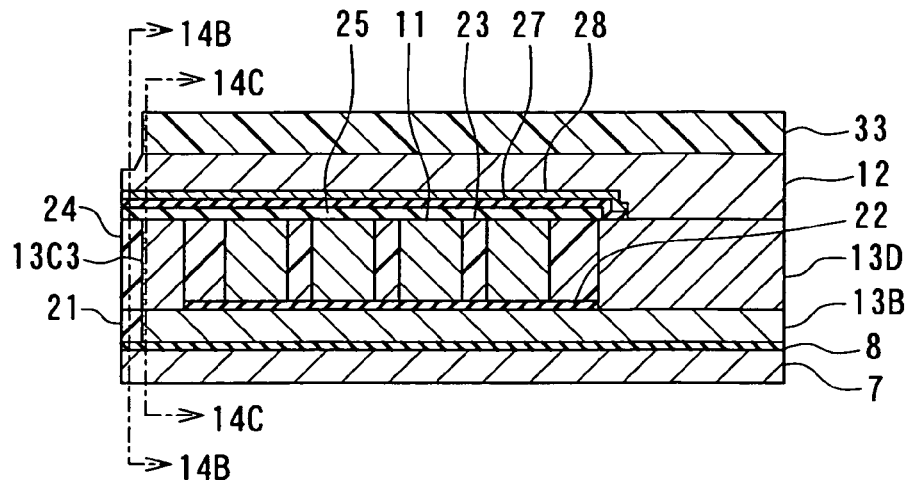
FIG. 14A to FIG. 14C are views for illustrating a step that follows the step shown in FIG. 13A to FIG. 13C.
Figure 14B:
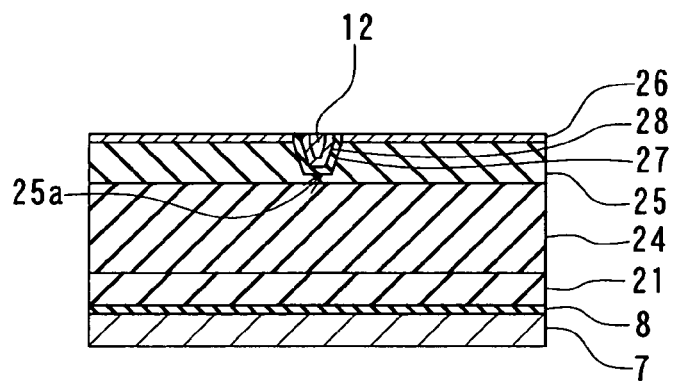
Figure 14C:
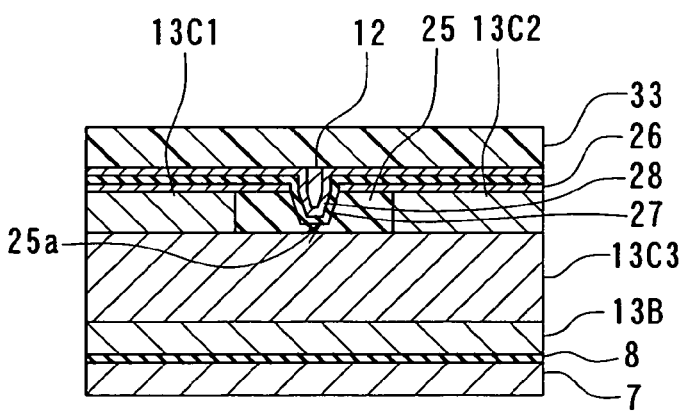

FIG. 14A to FIG. 14C illustrate the following step. FIG. 14A shows a cross section of a layered structure obtained in the manufacturing process of the magnetic head, the cross section being orthogonal to the medium facing surface and the substrate. FIG. 14B shows a cross section of the layered structure taken along line 14B-14B of FIG. 14A. FIG. 14C shows a cross section of the layered structure taken along line 14C-14C of FIG. 14A.

In the step, first, a photoresist layer is formed on the entire top surface of the layered structure. The photoresist layer is then patterned to form a mask 33 for etching a portion of the magnetic layer 12P. The mask 33 covers a portion of the top surface of the magnetic layer 12P that will be the top surface of the second portion of the pole layer 12 later. Next, the portion of the magnetic layer 12P is etched by ion beam etching, for example, using the mask 33. The magnetic layer 12P is thereby formed into the pole layer 12. This etching is performed such that the second side A2 of the end face of the pole layer 12 located in the medium facing surface 30 is located at a level that falls within a range between the height of the top surface of the nonmagnetic metal layer 26 as initially formed and the height of the bottom surface thereof. Therefore, the nonmagnetic metal layer 26 serves as the reference indicating the level at which this etching is stopped. The portion of the magnetic layer 12P is etched by the foregoing manner, so that each of the track width and the thickness of the pole layer 12 taken in the medium facing surface 30 is controlled to be nearly uniform. It is thereby possible to control the thickness of the pole layer 12 and the track width with precision. Next, the mask 33 is removed.

Figure 15A:
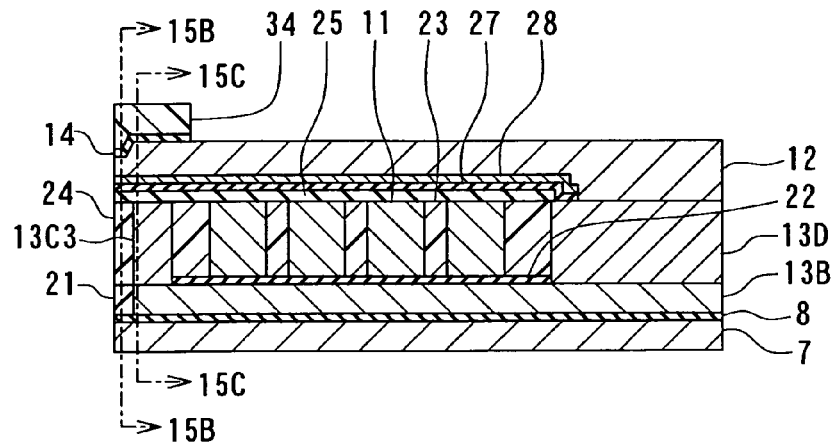
FIG. 15A to FIG. 15C are views for illustrating a step that follows the step shown in FIG. 14A to FIG. 14C.
Figure 15B:
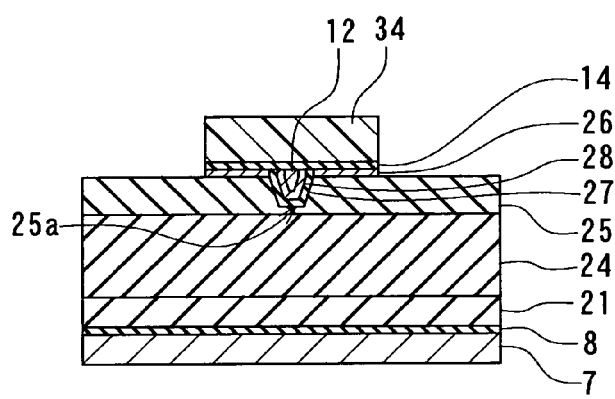
Figure 15C:
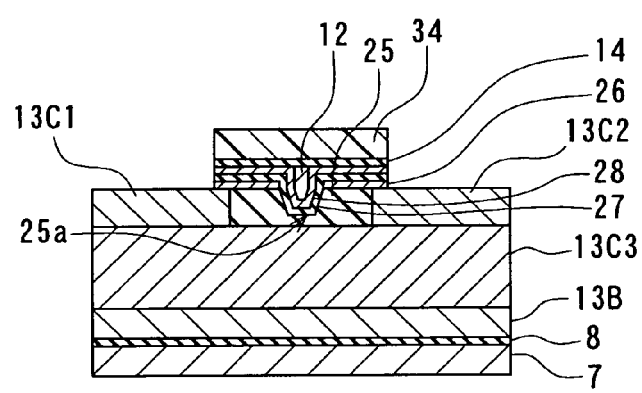

FIG. 15A to FIG. 15C illustrate the following step. FIG. 15A shows a cross section of a layered structure obtained in the manufacturing process of the magnetic head, the cross section being orthogonal to the medium facing surface and the substrate. FIG. 15B shows a cross section of the layered structure taken along line 15B-15B of FIG. 15A. FIG. 15C shows a cross section of the layered structure taken along line 15C-15C of FIG. 15A.

In the step, first, the gap layer 14 is formed on the entire top surface of the layered structure. The gap layer 14 is formed by sputtering or CVD, for example. If the gap layer 14 is formed by CVD, it is preferred to employ ALCVD. If the gap layer 14 is formed by ALCVD, the material of the gap layer 14 is preferably alumina among insulating materials, or Ta or Ru among conductive materials. The gap layer 14 formed by ALCVD exhibits a good step coverage. Therefore, it is possible to form the gap layer 14 that is thin and uniform on the bending top surface of the pole layer 12 by employing ALCVD to form the gap layer 14.

Next, a photoresist layer is formed on the entire top surface of the layered structure. The photoresist layer is then patterned to form a mask 34. The mask 34 covers a portion of the gap layer 14 to be left. Next, the gap layer 14, the nonmagnetic metal layer 26, the nonmagnetic film 27 and the polishing stopper layer 28 are selectively etched, using the mask 34. As a result, the top surfaces of the first portion 13C1 and the second portion 13C2 are exposed, and a portion of the top surface of the pole layer 12 is exposed. Next, the mask 34 is removed.

Figure 16A:
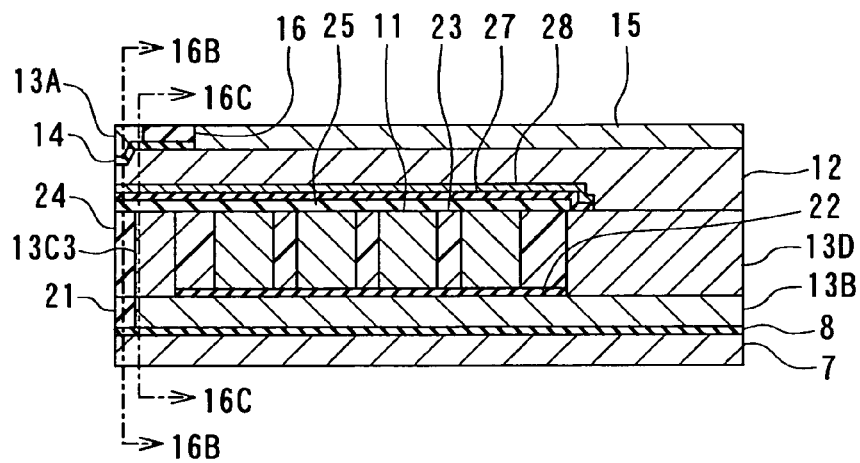
FIG. 16A to FIG. 16C are views for illustrating a step that follows the step shown in FIG. 15A to FIG. 15C.
Figure 16B:
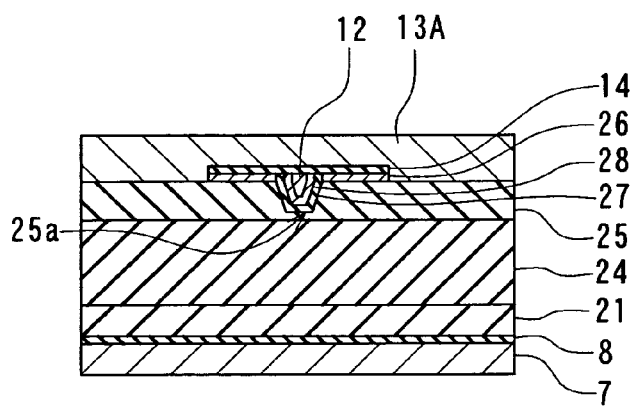
Figure 16C:
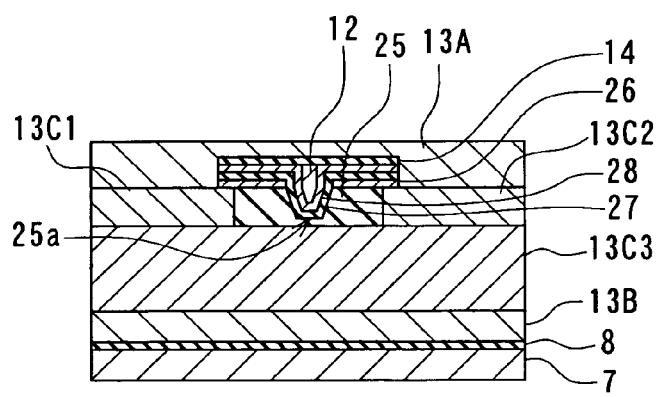

FIG. 16A to FIG. 16C illustrate the following step. FIG. 16A shows a cross section of a layered structure obtained in the manufacturing process of the magnetic head, the cross section being orthogonal to the medium facing surface and the substrate. FIG. 16B shows a cross section of the layered structure taken along line 16B-16B of FIG. 16A. FIG. 16C shows a cross section of the layered structure taken along line 16C-16C of FIG. 16A.

In the step, first, the first layer 13A is formed on the first portion 13C1, the second portion 13C2 and the gap layer 14. At the same time, the yoke layer 15 is formed on the pole layer 12. The first layer 13A and the yoke layer 15 may be formed by frame plating or by making a magnetic layer through sputtering and then selectively etching the magnetic layer. Next, the nonmagnetic layer 16 is formed on the entire top surface of the layered structure. Next, the nonmagnetic layer 16 is polished by CMP, for example, so that the first layer 13A and the yoke layer 15 are exposed, and the top surfaces of the first layer 13A, the yoke layer 15 and the nonmagnetic layer 16 are flattened. The yoke layer 15 polished has a thickness of 0.25 to 0.45 µm, for example. Alternatively, the above-mentioned step of flattening the top surfaces of the first layer 13A, the yoke layer 15 and the nonmagnetic layer 16 may be omitted, so that the first layer 13A and the yoke layer 15 have the shapes as initially formed.

Figure 17A:
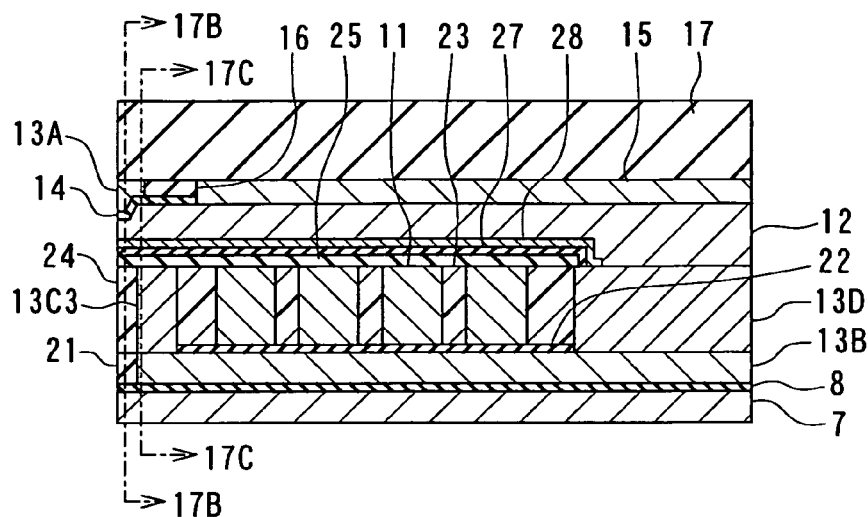
FIG. 17A to FIG. 17C are views for illustrating a step that follows the step shown in FIG. 16A to FIG. 16C.
Figure 17B:
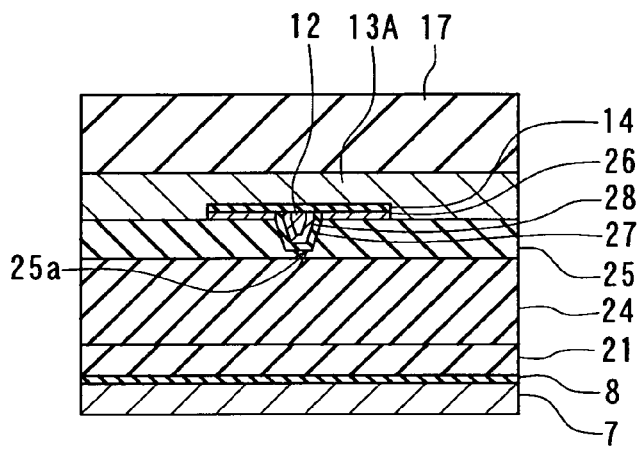
Figure 17C:
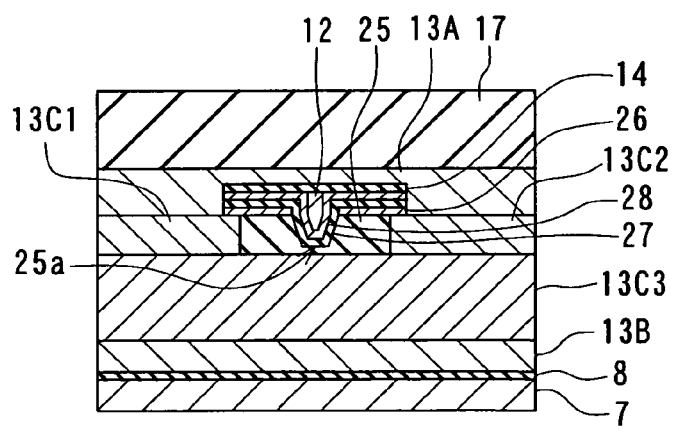

FIG. 17A to FIG. 17C illustrate the following step. FIG. 17A shows a cross section of a layered structure obtained in the manufacturing process of the magnetic head, the cross section being orthogonal to the medium facing surface and the substrate. FIG. 17B shows a cross section of the layered structure taken along line 17B-17B of FIG. 17A. FIG. 17C shows a cross section of the layered structure taken along line 17C-17C of FIG. 17A.

In the step, first, the protection layer 17 is formed to cover the entire top surface of the layered structure. Wiring and terminals are then formed on the protection layer 17, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head, the coil 11 generates a magnetic field that corresponds to the data to be written on the medium. The pole layer 12 and the shield 13 form a magnetic path through which a magnetic flux corresponding to the magnetic field generated by the coil 11 passes. The pole layer 12 allows the flux corresponding to the field generated by the coil 11 to pass and generates a write magnetic field used for writing the data on the medium by means of the perpendicular magnetic recording system. The shield 13 takes in a disturbance magnetic field applied from outside the magnetic head to the magnetic head. It is thereby possible to prevent erroneous writing on the recording medium caused by the disturbance magnetic field intensively taken in into the pole layer 12. Furthermore, the shield 13 has a function of preventing a magnetic flux from reaching the recording medium, the flux being generated from the end face of the pole layer 12 and extending in directions except the direction orthogonal to the surface of the recording medium. The shield 13 also has a function of returning a magnetic flux that has been generated from the end face of the pole layer 12 and has magnetized the recording medium.

The shield 13 incorporates: the first layer 13A having the end face located in a region of the medium facing surface 30 forward of the end face of the pole layer 12 along the direction T of travel of the recording medium; the second layer 13B disposed in a region sandwiching the pole layer 12 with the first layer 13A; the first coupling portion 13C coupling the first layer 13A to the second layer 13B without touching the pole layer 12; and the second coupling portion 13D located farther from the medium facing surface 30 than the first coupling portion 13C and coupling the pole layer 12 to the second layer 13B. The first coupling portion 13C has the first portion 13C1, the second portion 13C2 and the third portion 13C3. The first portion 13C1 and the second portion 13C2 are connected to the first layer 13A and disposed on both sides of the pole layer 12 opposed to each other in the direction of track width. The third portion 13C3 is disposed between the medium facing surface 30 and part of the coil 11 and couples the second layer 13B to each of the first portion 13C1 and the second portion 13C2.

As thus described, in the embodiment, the first layer 13A and the second layer 13B of the shield 13 are located in the regions sandwiching the pole layer 12 in between. Therefore, according to the embodiment, it is possible to suppress expansion of the magnetic flux in regions both forward and backward of the end face of the pole layer 12 along the direction T of travel of the recording medium and to suppress leakage flux reaching the recording medium. It is thereby possible to suppress the wide-range adjacent track erase.

According to the embodiment, part of the coil 11 passes through the space surrounded by the pole layer 12, the second layer 13B, the first coupling portion 13C and the second coupling portion 13D. It is thereby possible to prevent the end portion of the first layer 13A closer to the medium facing surface 30 from protruding in response to expansion of the insulating layer 23 disposed around the coil 11. As a result, according to the embodiment, it is possible to define the throat height TH with accuracy and to suppress protrusion of the end portion of the shield 13 closer to the medium facing surface 30, that is, the end portion of the first layer 13A closer to the medium facing surface 30, due to the heat produced by the coil 11.

According to the embodiment, in the medium facing surface 30, the end face of the first layer 13A is located forward of the end face of the pole layer 12 along the direction T of travel of the recording medium (that is, located closer to the air outflow end of the slider) with a specific small space created by the gap layer 14. The location of an end of the bit pattern written on the recording medium is determined by the location of the end of the pole layer 12 that is closer to the gap layer 14 and located in the medium facing surface 30. The first layer 13A takes in a magnetic flux generated from the end face of the pole layer 12 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, each of the second layer 13B and the first coupling portion 13C has the end face located closer to the medium facing surface 30, the end face being located at a distance from the medium facing surface 30. The insulating layer 21 is disposed between the medium facing surface 30 and the end face of the second layer 13B closer to the medium facing surface 30. The insulating layer 24 and the encasing layer 25 are disposed between the medium facing surface 30 and the end face of the first coupling portion 13C closer to the medium facing surface 30. As a result, according to the embodiment, it is possible to suppress protrusion of the end face of each of the second layer 13B and the first coupling portion 13C in response to expansion of the insulating layer 23 disposed around the coil 11.

According to the embodiment, the throat height TH is not defined by the end of the first layer 13A farther from the medium facing surface 30 but defined by the point at which the gap layer 14 first bends when seen from the medium facing surface 30, that is, the point at which the bottom surface of the first layer 13A first bends when seen from the medium facing surface 30. As a result, it is possible to reduce the throat height TH while the volume of the first layer 13A is sufficiently increased. It is thereby possible to improve the overwrite property.

According to the embodiment, as shown in FIG. 3, the end face of the pole layer 12 located in the medium facing surface 30 has a width that decreases as the distance from the first side A1 decreases. It is thereby possible to prevent the problems resulting from the skew.

According to the embodiment, the pole layer 12 is disposed in the groove 25a of the encasing layer 25 made of a nonmagnetic material with the nonmagnetic film 27 and the polishing stopper layer 28 disposed between the pole layer 12 and the groove 25a. Consequently, the pole layer 12 is smaller than the groove 25a in width. It is thereby possible to easily form the groove 25a and to easily reduce the width of the pole layer 12 and the width of the top surface of the track width defining portion 12A that defines the track width, in particular. As a result, according to the embodiment, it is possible to easily implement the track width that is smaller than the minimum track width that can be formed by photolithography and to control the track width with accuracy.

MODIFICATION EXAMPLES

First and second modification examples of the embodiment will now be described. Reference is now made to FIG. 18 to FIG. 21 to describe a method of manufacturing a magnetic head of the first modification example. FIG. 18 to FIG. 21 each illustrate a cross section of a layered structure obtained in manufacturing process of the magnetic head orthogonal to the medium facing surface and the substrate. In FIG. 18 to FIG. 21 the portions closer to the substrate 1 than the top shield layer 7 are omitted.

Figure 18:
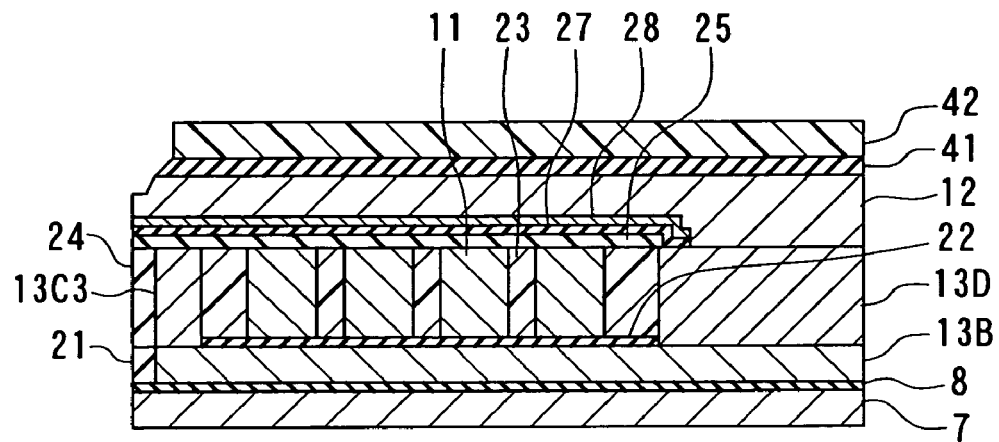
FIG. 18 is a cross-sectional view for illustrating a step of a method of manufacturing a magnetic head of a first modification example of the first embodiment of the invention.
Figure 19:
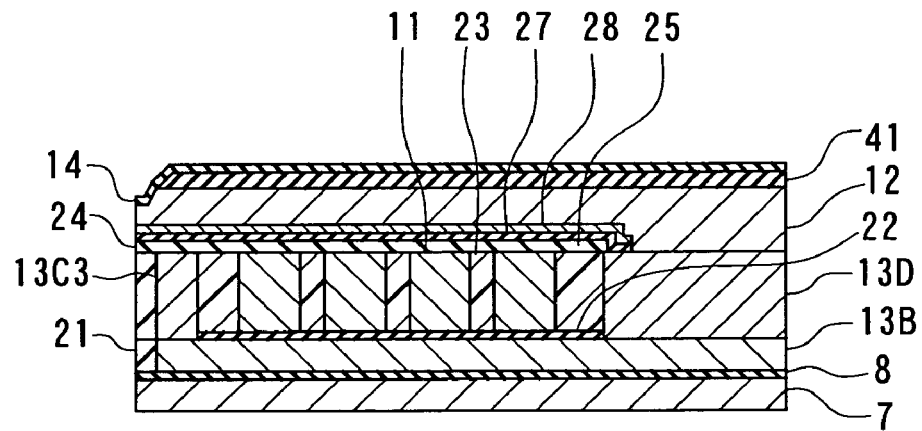
FIG. 19 is a cross-sectional view for illustrating a step that follows the step shown in FIG. 18.

FIG. 18 illustrates the step that follows the step shown in FIG. 13A to FIG. 13C. In the step, first, a nonmagnetic film 41 made of a nonmagnetic material such as alumina is formed by sputtering, for example, on the entire top surface of the layered structure. Next, a photoresist layer is formed on the entire top surface of the layered structure. The photoresist layer is then patterned to form a mask 42 for etching portions of the magnetic layer 12P and the nonmagnetic film 41. Next, the portion of the nonmagnetic film 41 is etched by reactive ion etching, for example, using the mask 42. Next, the portion of the magnetic layer 12P is etched by ion beam etching, for example, using the mask 42. The magnetic layer 12P is thereby formed into the pole layer 12. This etching is performed such that the second side A2 of the end face of the pole layer 12 located in the medium facing surface 30 is located at a level that falls within a range between the height of the top surface of the nonmagnetic metal layer 26 as initially formed and the height of the bottom surface thereof. Next, the mask 42 is removed. Next, as shown in FIG. 19, the gap layer 14 is formed on the entire top surface of the layered structure.

Figure 20:
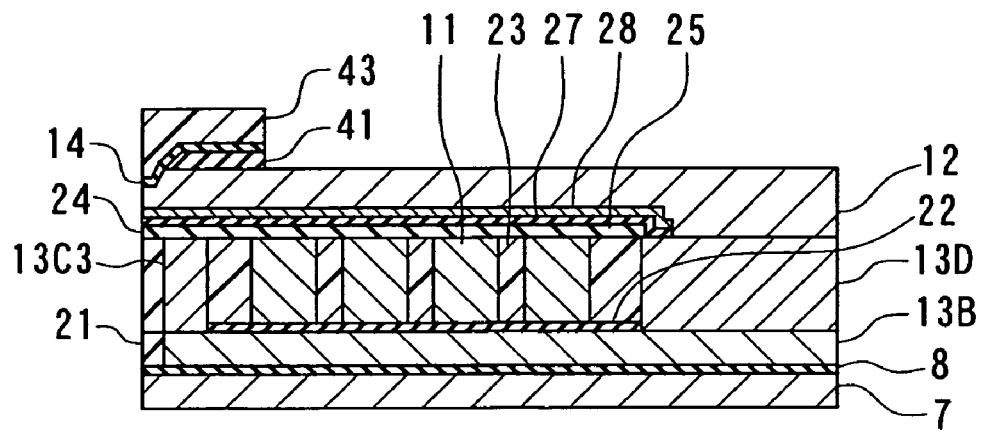
FIG. 20 is a cross-sectional view for illustrating a step that follows the step shown in FIG. 19.

FIG. 20 illustrates the following step. In the step, first, a photoresist layer is formed on the entire top surface of the layered structure. The photoresist layer is then patterned to form a mask 43. The mask 43 covers a portion of the gap layer 14 to be left. Next, the gap layer 14, the nonmagnetic film 41, the nonmagnetic metal layer 26, the nonmagnetic film 27 and the polishing stopper layer 28 are selectively etched, using the mask 43. As a result, the top surfaces of the first portion 13C1 and the second portion 13C2 are exposed, and a portion of the top surface of the pole layer 12 is exposed. Next, the mask 43 is removed.

Figure 21:
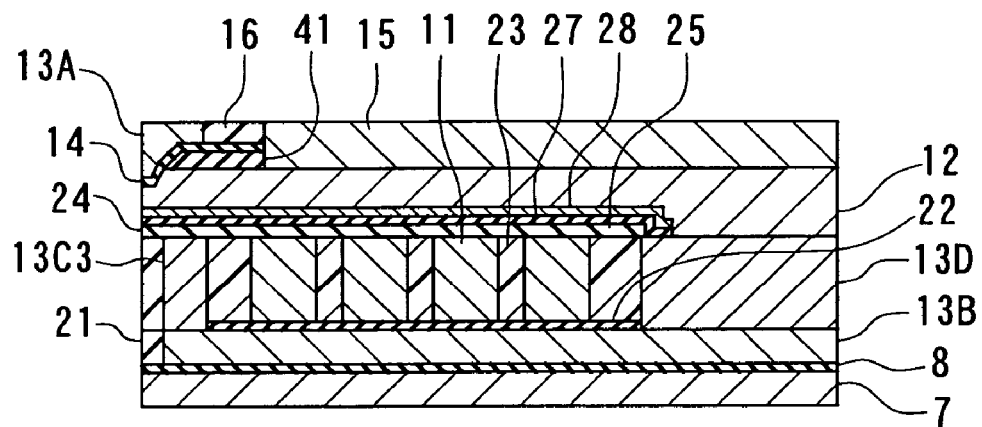
FIG. 21 is a cross-sectional view for illustrating a step that follows the step shown in FIG. 20.

FIG. 21 illustrates the following step. In the step, first, the first layer 13A is formed on the first portion 13C1, the second portion 13C2 and the gap layer 14. At the same time, the yoke layer 15 is formed on the pole layer 12. Next, the nonmagnetic layer 16 is formed on the entire top surface of the layered structure. Next, the nonmagnetic layer 16 is polished by CMP, for example, so that the first layer 13A and the yoke layer 15 are exposed, and the top surfaces of the first layer 13A, the yoke layer 15 and the nonmagnetic layer 16 are flattened. Next, although not shown, the protection layer 17 is formed to cover the entire top surface of the layered structure. Wiring and terminals are then formed on the protection layer 17, the substrate is cut into sliders, and the steps including polishing of the medium facing surface 30 and fabrication of flying rails are performed. The magnetic head is thus completed.

In the magnetic head of the first modification example, the gap layer 14 and the nonmagnetic film 41 are disposed between the pole layer 12 and the first layer 13A in the region farther from the medium facing surface 30 than the point at which the gap layer 14 first bends when seen from the medium facing surface 30. Therefore, flux leakage in this region between the pole layer 12 and the first layer 13A is less, compared with the case in which the nonmagnetic film 41 is not provided. As a result, it is possible to introduce a magnetic flux of greater magnitude to the medium facing surface 30 and to thereby improve the overwrite property. The remainder of configuration, function and effects of the magnetic head of the first modification example are similar to those of the magnetic head of FIG. 1 to FIG. 5.

Figure 22:
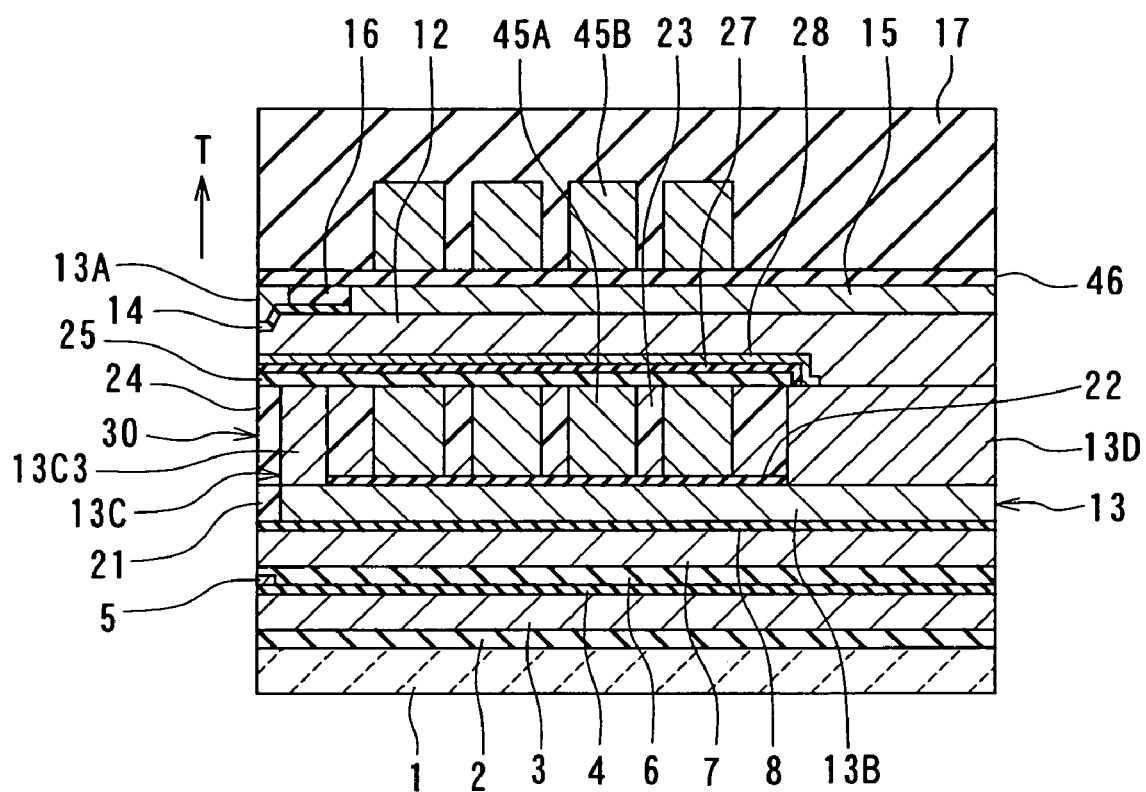
FIG. 22 is a cross-sectional view of a magnetic head of a second modification example of the first embodiment of the invention.

FIG. 22 illustrates a cross section of a magnetic head of the second modification example orthogonal to the medium facing surface and the substrate. The magnetic head comprises a helical coil wound around the pole layer 12 in place of the flat-whorl-shaped coil 11 of FIG. 2. The coil incorporates: a lower layer 45A disposed on the insulating layer 22; an upper layer 45B disposed above the pole layer 12; and a coupling portion not shown that couples the lower layer 45A to the upper layer 45B. In the magnetic head of the second modification example, an insulating layer 46 is disposed on the first layer 13A, the pole layer 12 and the yoke layer 15. The upper layer 45B is disposed on the insulating layer 46 and covered with the protection layer 17.

According to the second modification example, it is possible to make the resistance of the helical coil lower, compared with the resistance of the flat-whorl-shaped coil 11. It is thereby possible to further suppress protrusion of the end portion of the shield 13 closer to the medium facing surface 30, that is, the end portion of the first layer 13A closer to the medium facing surface 30, due to the heat produced by the coil. As a result, it is possible to reduce the distance between the slider and the recording medium and to thereby improve the performance of the magnetic head. The remainder of configuration, function and effects of the magnetic head of the second modification example are similar to those of the magnetic head of FIG. 1 to FIG. 5.

Second Embodiment

Figure 23:
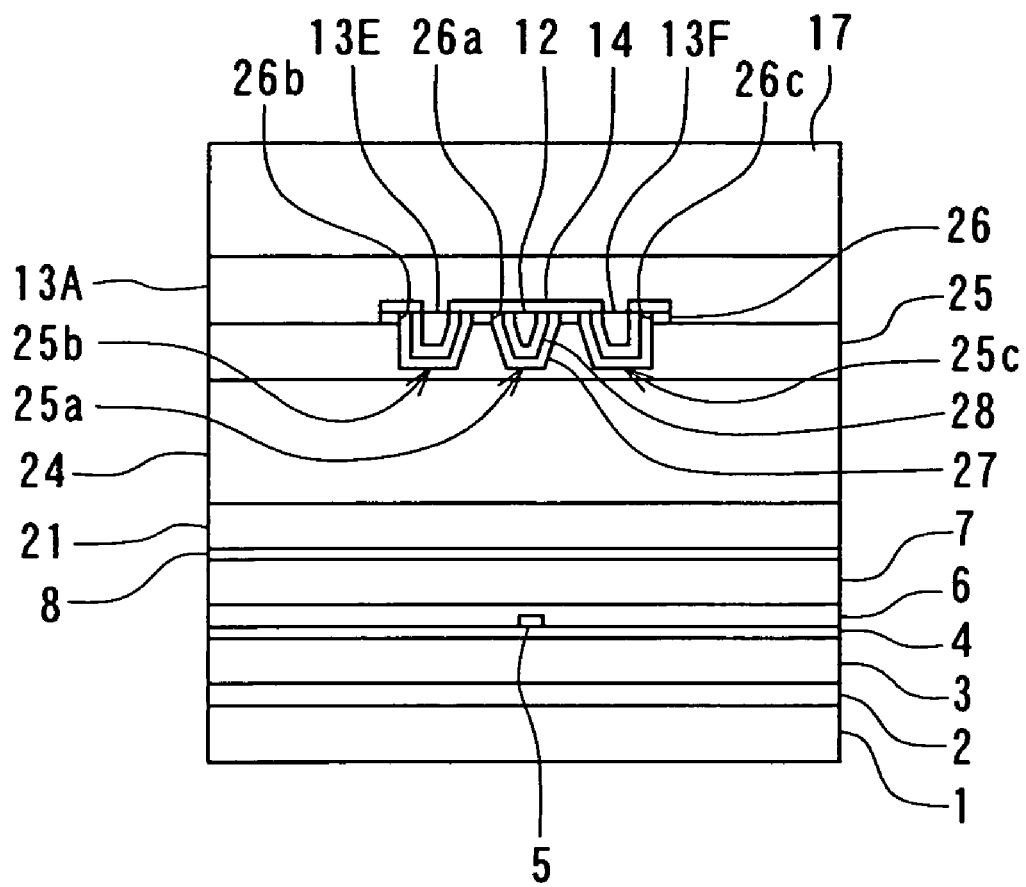
FIG. 23 is a front view of the medium facing surface of a magnetic head of a second embodiment of the invention.
Figure 24:
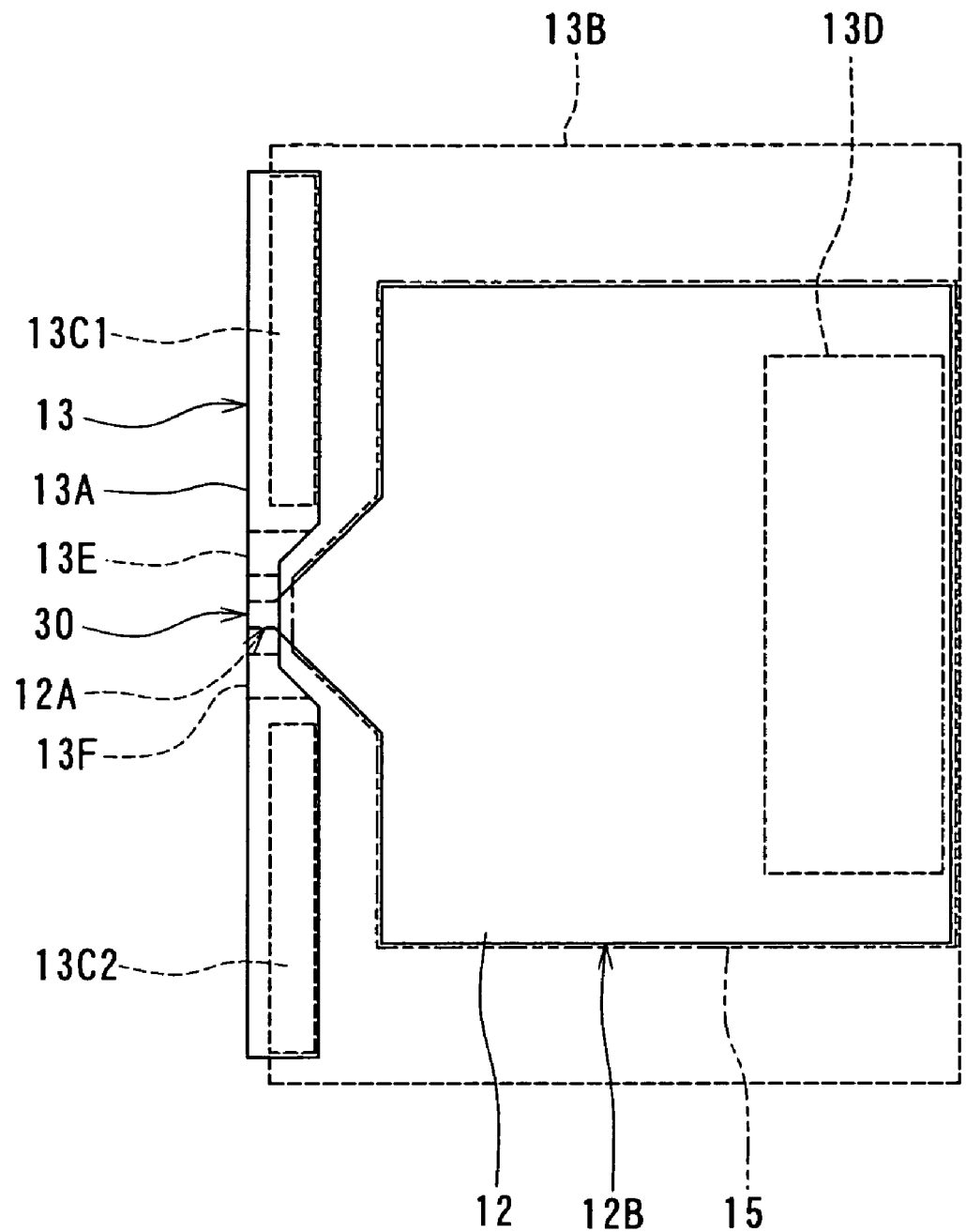
FIG. 24 is a top view illustrating the pole layer and the shield of the magnetic head of the second embodiment of the invention.

A magnetic head and a method of manufacturing the same of a second embodiment of the invention will now be described. Reference is now made to FIG. 23 and FIG. 24 to describe the configuration of the magnetic head of the second embodiment. FIG. 23 is a front view of the medium facing surface of the magnetic head of the embodiment. FIG. 24 is a plan view illustrating the pole layer and the shield of the magnetic head of the embodiment.

As shown in FIG. 23 and FIG. 24, the shield 13 of the magnetic head of the second embodiment incorporates a first side shield layer 13E and a second side shield layer 13F in addition to the first layer 13A, the second layer 13B, the first coupling portion 13C and the second coupling portion 13D. The side shield layers 13E and 13F are connected to the first layer 13A and disposed on both sides of the pole layer 12 opposed to each other in the direction of track width. Each of the side shield layers 13E and 13F has an end face located in the medium facing surface 30. Each of the side shield layers 13E and 13F is made of a magnetic material. The material of the side shield layers 13E and 13F may be the same as that of the pole layer 12.

In the second embodiment, the encasing layer 25 has grooves 25b and 25c in addition to the groove 25a, wherein the grooves 25b and 25c open in the top surface of the encasing layer 25 and accommodate the side shield layers 13E and 13F. The nonmagnetic metal layer 26 has openings 26b and 26c in addition to the opening 26a. The edges of the openings 26b and 26c are located directly above the edges of the grooves 25b and 25c in the top surface of the encasing layer 25. The nonmagnetic film 27 and the polishing stopper layer 28 are located in the groove 25b and the opening 26b and in the groove 25c and the opening 26c, in addition to the groove 25a and the opening 26a. The nonmagnetic film 27 is disposed to touch the surfaces of the grooves 25b and 25c. The side shield layers 13E and 13F are disposed apart from the surfaces of the grooves 25b and 25c, respectively. The polishing stopper layer 28 is disposed between the nonmagnetic film 27 and the side shield layers 13E and 13F.

Reference is now made to FIG. 25 to FIG. 29 to describe a method of manufacturing the magnetic head of the second embodiment. FIG. 25 to FIG. 29 are cross-sectional views of layered structures obtained in manufacturing process of the magnetic head. FIG. 25 to FIG. 29 show cross sections of portions of the layered structures near the medium facing surface, the cross sections being parallel to the medium facing surface. The portions closer to the substrate 1 than the top shield layer 7 are omitted in FIG. 25 to FIG. 29.

The method of manufacturing the magnetic head of the second embodiment includes the steps up to the step of flattening the top surfaces of the first portion 13C1, the second portion 13C2 and the nonmagnetic layer 25P as shown in FIG. 9A to FIG. 9C that are the same as those of the first embodiment.

Figure 25:
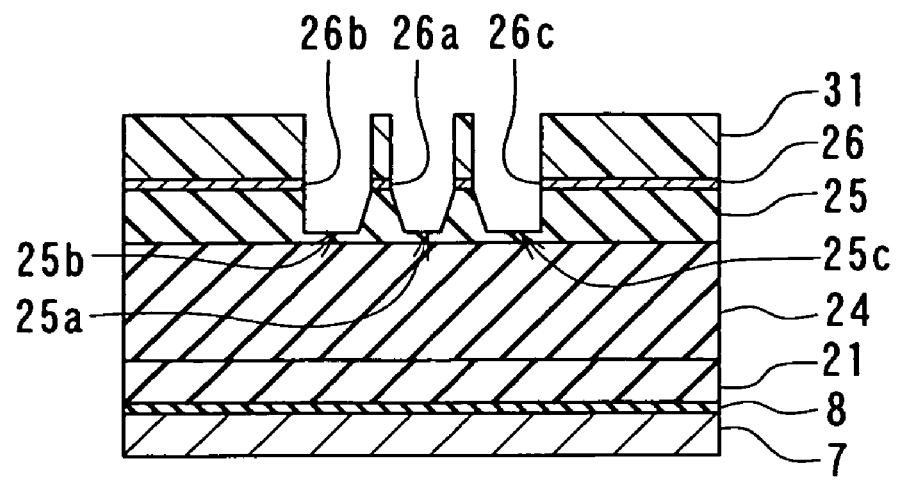
FIG. 25 is a cross-sectional view for illustrating a step of a method of manufacturing the magnetic head of the second embodiment of the invention.

FIG. 25 illustrates the following step. In the step, first, the nonmagnetic metal layer 26 is formed by sputtering, for example, on the first portion 13C1, the second portion 13C2 and the nonmagnetic layer 25P as in the first embodiment. Next, a photoresist layer having a thickness of 1.0 µm, for example, is formed on the nonmagnetic metal layer 26. The photoresist layer is then patterned to form the mask 31 for making the grooves 25a, 25b and 25c of the encasing layer 25. The mask 31 has three openings having shapes corresponding to the grooves 25a, 25b and 25c, respectively.

Next, the nonmagnetic metal layer 26 is selectively etched, using the mask 31. The openings 26a, 26b and 26c that penetrate are thereby formed in the nonmagnetic metal layer 26. The openings 26a, 26b and 26c have shapes corresponding to the plane geometries of the pole layer 12 and the side shield layers 13E and 13F, respectively, to be formed later. Furthermore, portions of the nonmagnetic layer 25P exposed from the openings 26a, 26b and 26c of the nonmagnetic metal layer 26 are selectively etched so as to form the grooves 25a, 25b and 25c in the nonmagnetic layer 25P. Furthermore, a portion of the nonmagnetic layer 25P located on the second coupling potion 13D is selectively etched so as to form a contact hole in the bottom surface of the groove 25a. The mask 31 is then removed. The nonmagnetic layer 25P is formed into the encasing layer 25 by forming the grooves 25a, 25b and 25c therein. The edges of the openings 26a, 26b and 26c of the nonmagnetic metal layer 26 are respectively located directly above the edges of the grooves 25a, 25b and 25c located in the top surface of the encasing layer 25. Each of the nonmagnetic metal layer 26 and the nonmagnetic layer 25P is etched by a method the same as that of the first embodiment.

Figure 26:
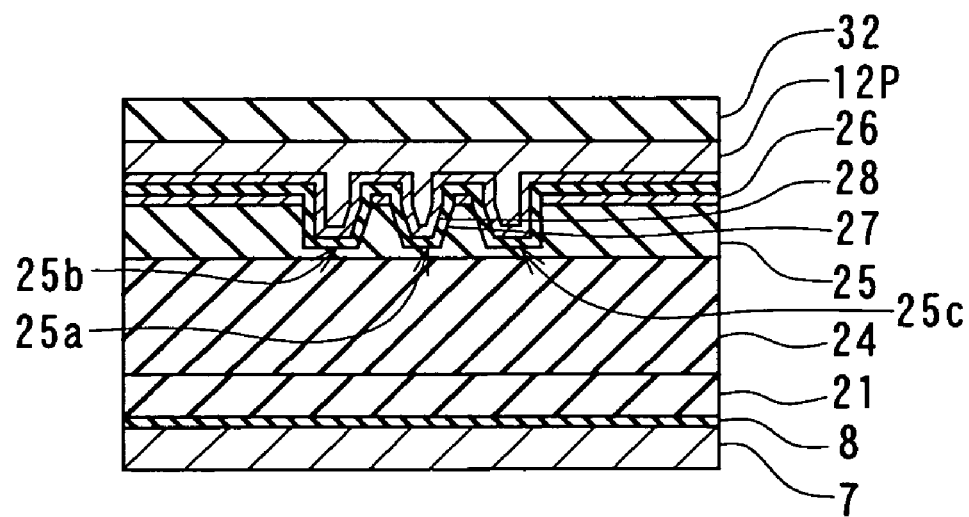
FIG. 26 is a cross-sectional view for illustrating a step that follows the step shown in FIG. 25.

FIG. 26 illustrates the following step. In the step, first, the nonmagnetic film 27 is formed on the entire top surface of the layered structure. The nonmagnetic film 27 is formed in the grooves 25a, 25b and 25c of the encasing layer 25, too. Next, the polishing stopper layer 28 is formed on the entire top surface of the layered structure. The polishing stopper layer 28 is formed in the grooves 25a, 25b and 25c of the encasing layer 25, too. The polishing stopper layer 28 indicates the level at which polishing of the polishing step to be performed later is stopped. Each of the nonmagnetic film 27 and the polishing stopper layer 28 is formed by a method the same as that of the first embodiment. Next, portions of the nonmagnetic film 27 and the polishing stopper layer 28 located on the second coupling portion 13D are selectively etched to form contact holes in the nonmagnetic film 27 and the polishing stopper layer 28.

Next, a magnetic layer 12P to be the pole layer 12 is formed on the entire top surface of the layered structure. The magnetic layer 12P is formed by a method the same as that of the first embodiment. Next, the coating layer 32 made of alumina, for example, and having a thickness of 0.5 to 1.2 µm, for example, is formed on the entire top surface of the layered structure.

Figure 27:
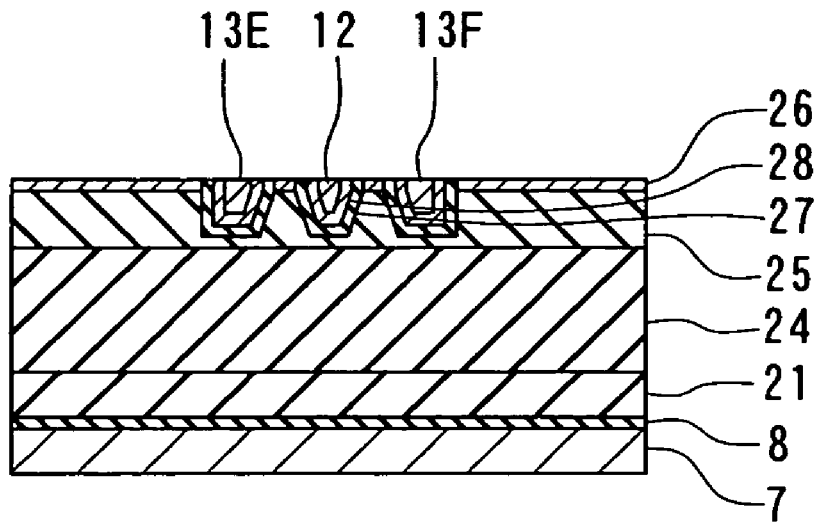
FIG. 27 is a cross-sectional view for illustrating a step that follows the step shown in FIG. 26.

FIG. 27 illustrates the following step. In the step, first, the coating layer 32 and the magnetic layer 12P are polished by CMP, for example, so that the polishing stopper layer 28 is exposed, and the top surfaces of the polishing stopper layer 28 and the magnetic layer 12P are thereby flattened. If the coating layer 32 and the magnetic layer 12P are polished by CMP, such a slurry is used that polishing is stopped when the polishing stopper layer 28 is exposed, such as an alumina-base slurry. Next, a portion of the magnetic layer 12P is etched by a method the same as the step illustrated in FIG. 14A to FIG. 14C of the first embodiment. The magnetic layer 12P is thereby formed into the pole layer 12 and the side shield layers 13E and 13F.

Figure 28:
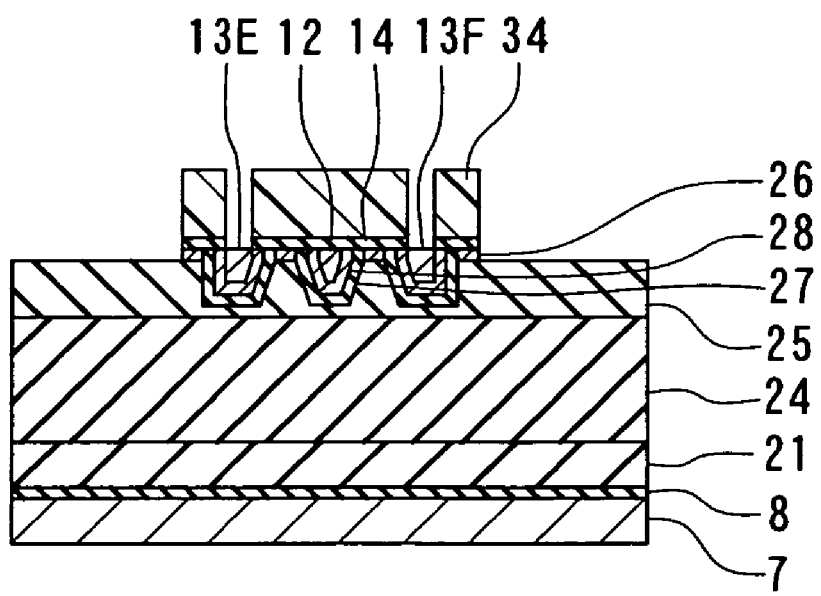
FIG. 28 is a cross-sectional view for illustrating a step that follows the step shown in FIG. 27.

FIG. 28 illustrates the following step. In the step, first, the gap layer 14 is formed on the entire top surface of the layered structure. The gap layer 14 is formed by a method the same as that of the first embodiment. Next, a photoresist layer is formed on the entire top surface of the layered structure. The photoresist layer is then patterned to form the mask 34. The mask 34 covers a portion of the gap layer 14 to be left. The mask 34 of the second embodiment has two openings having shapes corresponding to the shapes of the side shield layers 13E and 13F. Next, the gap layer 14, the nonmagnetic metal layer 26, the nonmagnetic film 27 and the polishing stopper layer 28 are selectively etched, using the mask 34. As a result, the top surfaces of the first portion 13C1, the second portion 13C2, and the side shield layers 13E and 13F are exposed, and a portion of the top surface of the pole layer 12 is exposed. Next, the mask 34 is removed.

Figure 29:
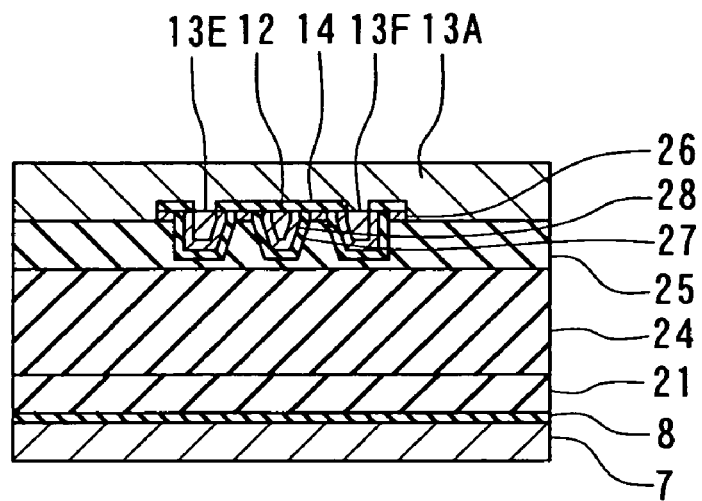
FIG. 29 is a cross-sectional view for illustrating a step that follows the step shown in FIG. 28.

FIG. 29 illustrates the following step. In the step, first, as in the step illustrated in FIG. 16A to FIG. 16C of the first embodiment, the first layer 13A is formed on the first portion 13C1, the second portion 13C2 and the gap layer 14. At the same time, the yoke layer 15 is formed on the pole layer 12. In the second embodiment, the first layer 13A touches the top surfaces of the side shield layers 13E and 13F. Next, as in the step illustrated in FIG. 16A to FIG. 16C, the nonmagnetic layer 16 is formed on the entire top surface of the layered structure. Next, the nonmagnetic layer 16 is polished by CMP, for example, so that the first layer 13A and the yoke layer 15 are exposed, and the top surfaces of the first layer 13A, the yoke layer 15 and the nonmagnetic layer 16 are flattened.

Next, as in the step illustrated in FIG. 17A to FIG. 17C of the first embodiment, the protection layer 17 is formed to cover the entire top surface of the layered structure. Wiring and terminals are then formed on the protection layer 17, the substrate is cut into sliders, and the steps including polishing of the medium facing surface 30 and fabrication of flying rails are performed. The magnetic head is thus completed.

The shield 13 of the second embodiment incorporates the side shield layers 13E and 13F. As a result, according to the embodiment, it is possible to further suppress expansion of the magnetic flux in regions on both sides of the end face of the pole layer 12 opposed to each other in the direction of track width and to further suppress leakage flux reaching the recording medium. It is thereby possible to further suppress the wide-range adjacent track erase. The remainder of configuration, function and effects of the second embodiment are similar to those of the first embodiment.

MODIFICATION EXAMPLE

Figure 30:
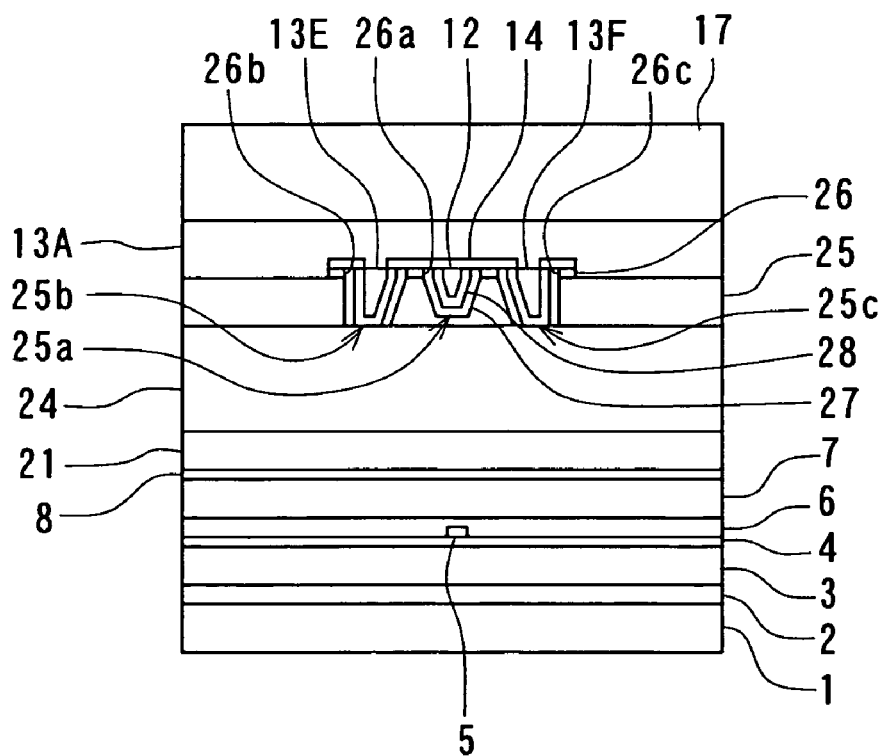
FIG. 30 is a cross-sectional view of a magnetic head of a modification example of the second embodiment of the invention.

A modification example of the second embodiment will now be described. FIG. 30 is a front view of the medium facing surface of a magnetic head of the modification example. In the modification example, the grooves 25b and 25c penetrate the encasing layer 25. At the bottoms of the grooves 25b and 25c, the nonmagnetic film 27 has been removed and the polishing stopper layer 28 touches the top surfaces of the third portion 13C3 (not shown) and the insulating layer 24. The remainder of configuration, function and effects of the modification example are similar to those of the magnetic head illustrated in FIG. 23 and FIG. 24.

In a method of manufacturing the magnetic head of the modification example, the grooves 25b and 25c are formed to penetrate the encasing layer 25 when the nonmagnetic layer 25P is selectively etched to form the grooves 25a, 25b and 25c. Furthermore, in the method of manufacturing the magnetic head of the modification example, after the nonmagnetic film 27 is formed, portions of the nonmagnetic film 27 are removed by etching at the bottoms of the grooves 25b and 25c. The remainder of steps of manufacturing the magnetic head of the modification example are the same as those of the method illustrated in FIG. 25 to FIG. 29.

It is possible to provide modification examples of the second embodiment that are similar to the modification examples of the first embodiment.

Third Embodiment

Figure 31:
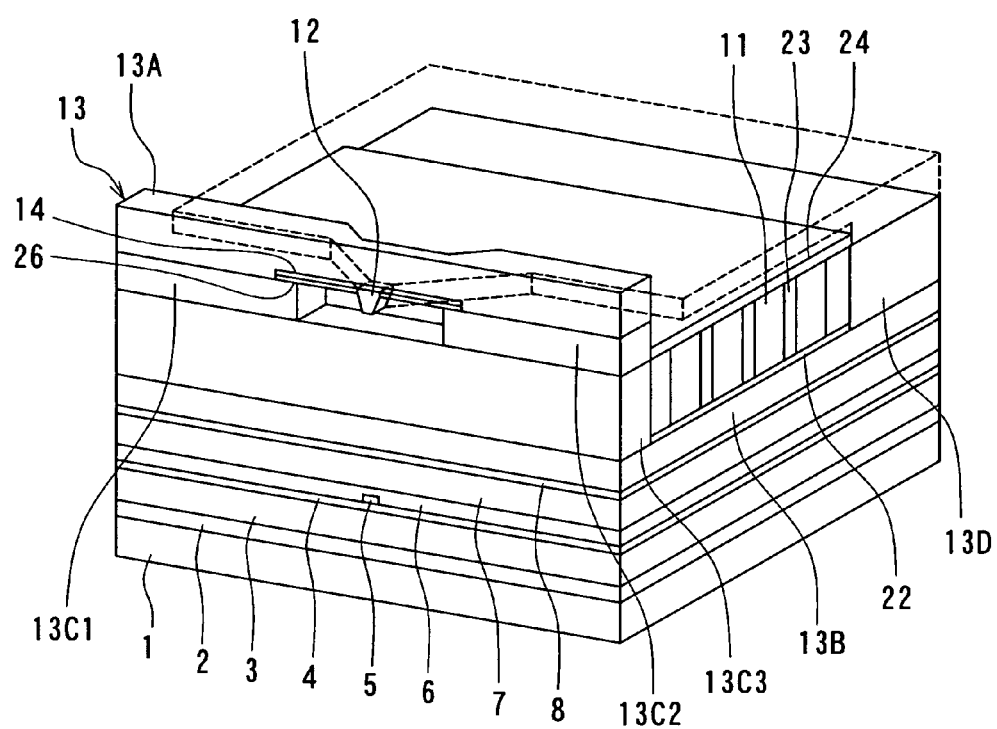
FIG. 31 is a perspective view illustrating a portion of a magnetic head of a third embodiment of the invention in a neighborhood of the medium facing surface.
Figure 32:
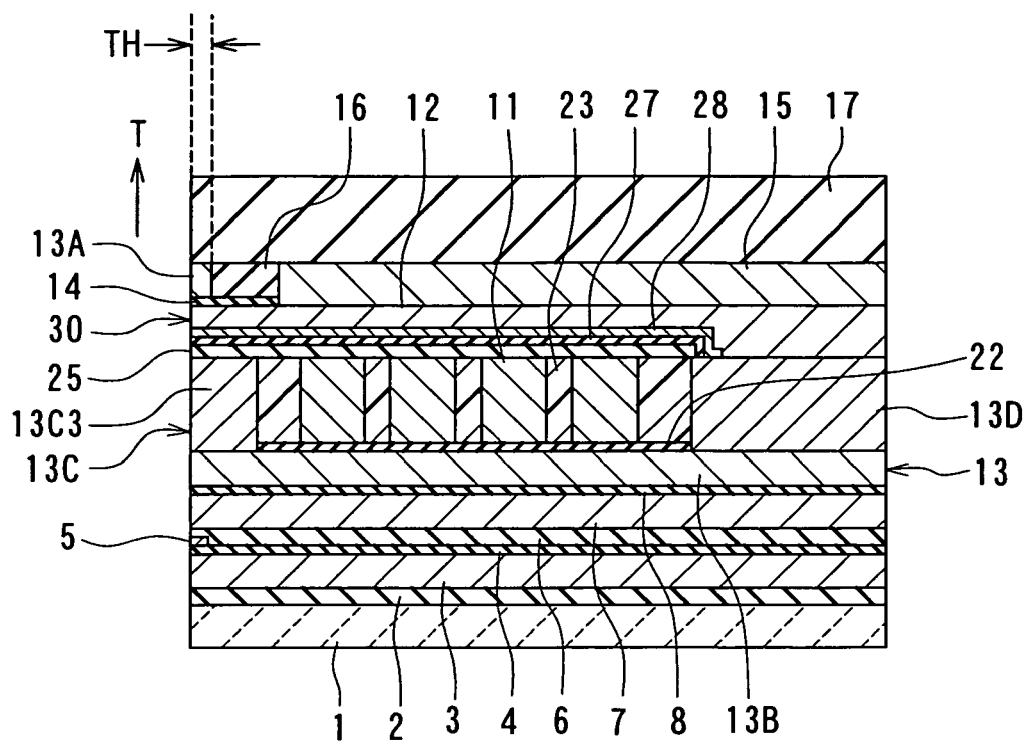
FIG. 32 is a cross-sectional view of the magnetic head of the third embodiment of the invention.
Figure 33:
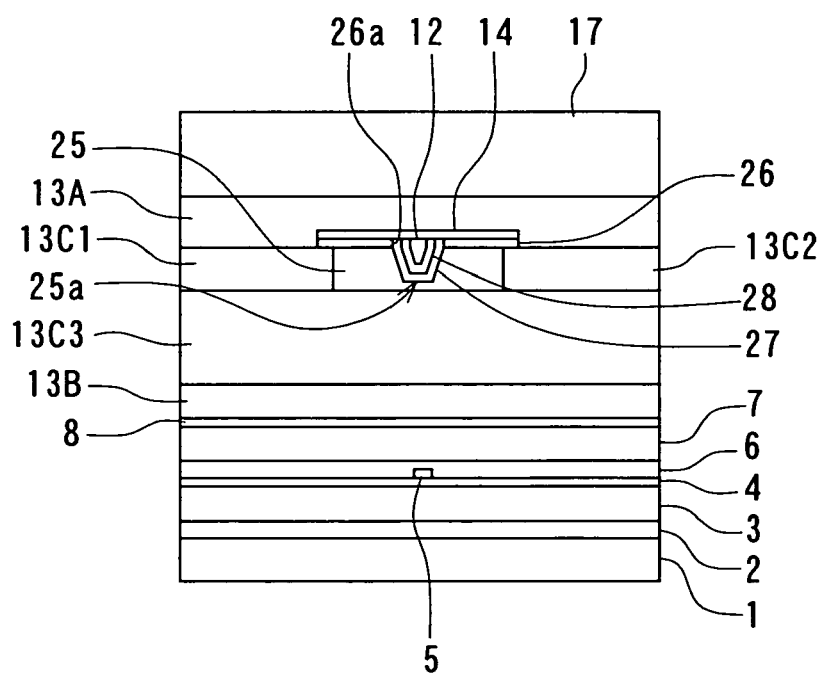
FIG. 33 is a front view of the medium facing surface of the magnetic head of the third embodiment of the invention.

Reference is now made to FIG. 31 to FIG. 33 to describe a magnetic head and a method of manufacturing the same of a third embodiment of the invention. FIG. 31 is a perspective view illustrating a portion of the magnetic head of the third embodiment in a neighborhood of the medium facing surface. FIG. 32 is a cross-sectional view of the magnetic head of the embodiment. FIG. 32 illustrates a cross section orthogonal to the medium facing surface and a surface of the substrate. The arrow indicated with T in FIG. 32 shows the direction of travel of a recording medium. FIG. 33 is a front view of the medium facing surface of the magnetic head of the embodiment.

In the third embodiment, the end face of the second layer 13B and the end face of the first coupling portion 13C (the first portion 13C1, the second portion 13C2 and the third portion 13C3) are each located in the medium facing surface 30. In the third embodiment, the pole layer 12 has a flat top surface.

In the third embodiment, the throat height TH is the length of a portion of the first layer 13A taken in the direction orthogonal to the medium facing surface 30, the portion being opposed to the pole layer 12 with the gap layer 14 disposed in between.

According to the method of manufacturing the magnetic head of the third embodiment, the second layer 13B, the first portion 13C1, the second portion 13C2 and the third portion 13C3 are formed such that their respective end faces are located in the medium facing surface 30.

According to the method of the third embodiment, as in the step illustrated in FIG. 13A to FIG. 13C of the first embodiment, the top surfaces of the polishing stopper layer 28 and the magnetic layer 12P are flattened, and then a portion of the polishing stopper layer 28 exposed in the top surface of the layered structure is selectively removed by a method such as reactive ion etching, ion beam etching or wet etching. Next, the nonmagnetic film 27, the polishing stopper layer 28 and the magnetic layer 12P are polished by CMP, for example, so that the nonmagnetic metal layer 26 is exposed, and the top surfaces of the nonmagnetic metal layer 26, the nonmagnetic film 27, the polishing stopper layer 28 and the magnetic layer 12P are thereby flattened. As a result, the magnetic layer 12P is formed into the pole layer 12. In the third embodiment, the step illustrated in FIG. 14A to FIG. 14C of the first embodiment is not performed while the gap layer 14 is formed on the flattened top surface of the nonmagnetic metal layer 26, the nonmagnetic film 27, the polishing stopper layer 28 and the pole layer 12.

The remainder of configuration, function and effects of the third embodiment are similar to those of the first embodiment.

MODIFICATION EXAMPLE

Figure 34:
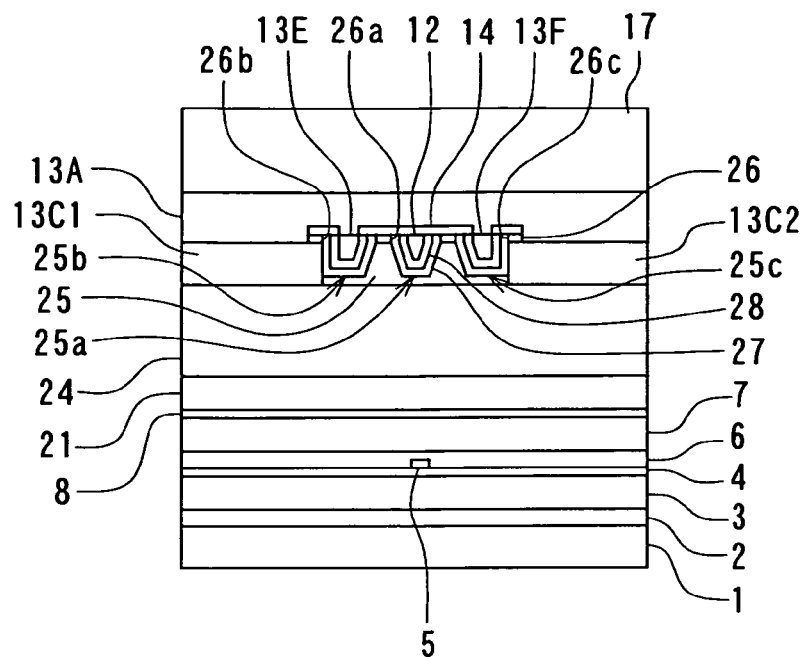
FIG. 34 is a front view of the medium facing surface of the magnetic head of the third embodiment of the invention.

A modification example of the third embodiment will now be described. FIG. 34 is a front view of the medium facing surface of a magnetic head of the modification example. The shield 13 of the modification example incorporates the side shield layers 13E and 13F as in the second embodiment. The encasing layer 25 has the grooves 25b and 25c in addition to the groove 25a, wherein the grooves 25b and 25c open in the top surface of the encasing layer 25 and accommodate the side shield layers 13E and 13F. The nonmagnetic metal layer 26 has the openings 26b and 26c in addition to the opening 26a. The edges of the openings 26b and 26c are located directly above the edges of the grooves 25b and 25c in the top surface of the encasing layer 25, respectively. The nonmagnetic film 27 and the polishing stopper layer 28 are located in the groove 25b and the opening 26b and in the groove 25c and the opening 26c, in addition to the groove 25a and the opening 26a. The nonmagnetic film 27 is disposed to touch the surfaces of the grooves 25b and 25c. The side shield layers 13E and 13F are disposed apart from the surfaces of the grooves 25b and 25c. The polishing stopper layer 28 is disposed between the nonmagnetic film 27 and the side shield layers 13E and 13F. The remainder of configuration, function and effects of the magnetic head of the modification example are similar to those of the magnetic head shown in FIG. 31 to FIG. 33.

It is possible to provide a modification example of the third embodiment that is similar to each of the modification examples of the first embodiment or the modification example of the second embodiment.

Fourth Embodiment

Figure 35:
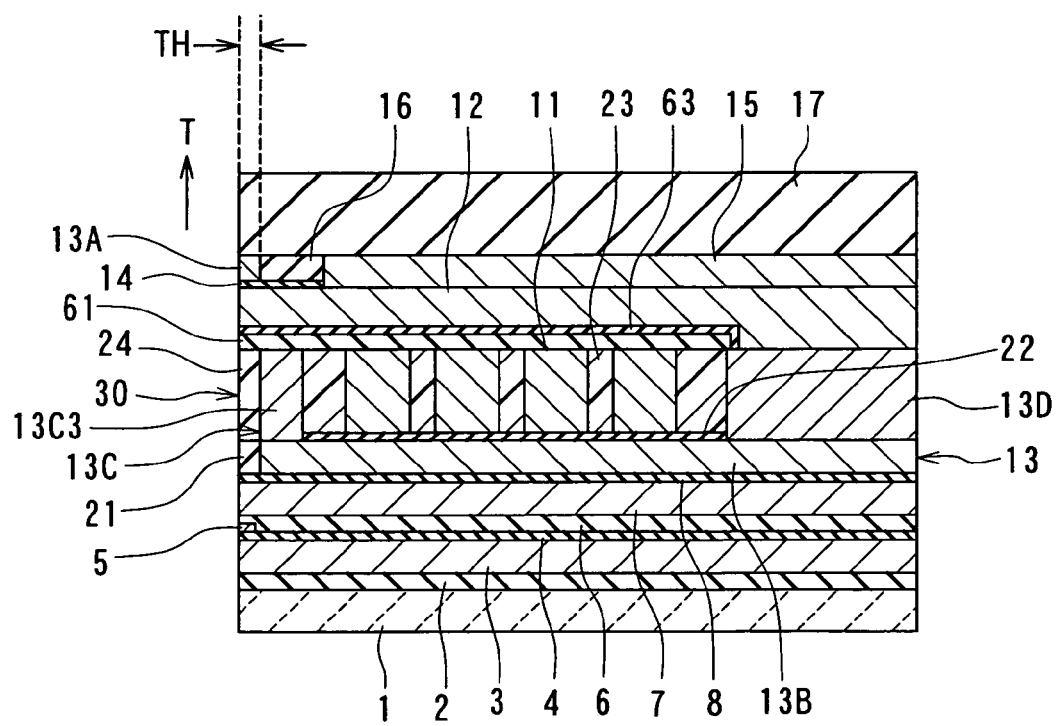
FIG. 35 is a cross-sectional view of a magnetic head of a fourth embodiment of the invention.
Figure 36:
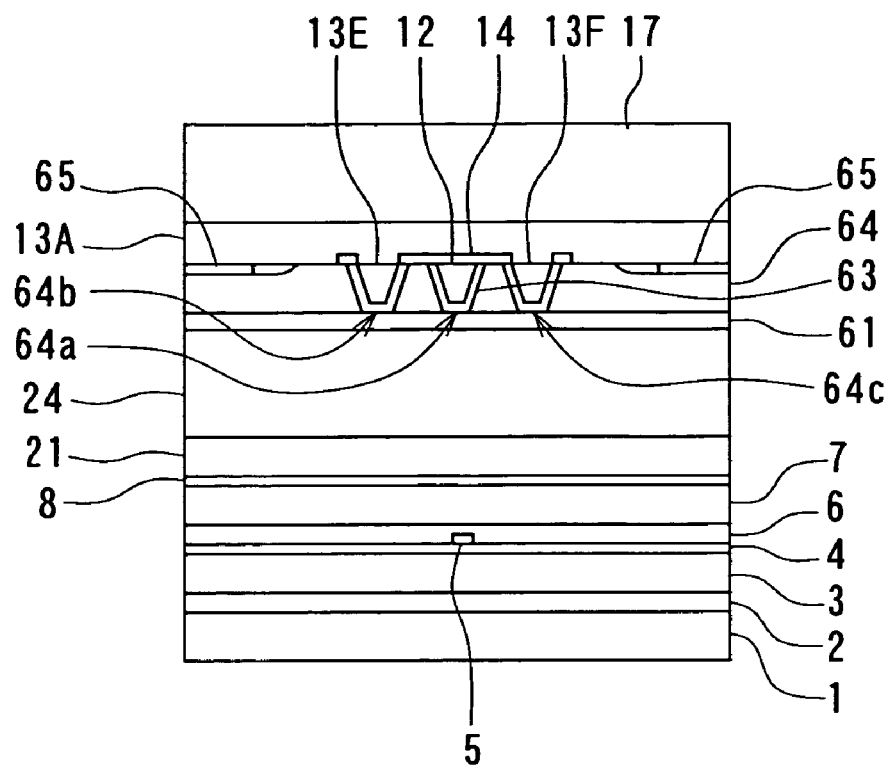
FIG. 36 is a front view of the medium facing surface of the magnetic head of the fourth embodiment of the invention.

A magnetic head and a method of manufacturing the same of a fourth embodiment of the invention will now be described. Reference is now made to FIG. 35 and FIG. 36 to describe the configuration of the magnetic head of the embodiment. FIG. 35 is a cross-sectional view of the magnetic head of the embodiment. FIG. 35 illustrates a cross section orthogonal to the medium facing surface and a surface of the substrate. The arrow indicated with T in FIG. 35 shows the direction of travel of a recording medium. FIG. 36 is a front view of the medium facing surface of the magnetic head of the embodiment.

The magnetic head of the fourth embodiment comprises an insulating layer 61 made of an insulating material and an encasing layer 64 made of a nonmagnetic material that are provided in place of the encasing layer 25 of the first embodiment. The insulating layer 61 is disposed on the flattened top surfaces of the third portion 13C3, the second coupling portion 13D, the coil 11, and the insulating layers 23 and 24. The encasing layer 64 is disposed on the insulating layer 61. The insulating layer 61 and the encasing layer 64 may be made of alumina, for example.

In the fourth embodiment, as in the second embodiment, the shield 13 incorporates the first side shield layer 13E and the second side shield layer 13F connected to the first layer 13A and disposed on both sides of the pole layer 12 opposed to each other in the direction of track width. Each of the side shield layers 13E and 13F has an end face located in the medium facing surface 30. Each of the side shield layers 13E and 13F is made of a magnetic material. The material of the side shield layers 13E and 13F may be the same as that of the pole layer 12.

The encasing layer 64 has grooves 64a, 64b and 64c for accommodating the pole layer 12 and the side shield layers 13E and 13F, respectively. The grooves 64a, 64b and 64c penetrate the encasing layer 64.

The magnetic head of the fourth embodiment comprises a nonmagnetic film 63 in place of the nonmagnetic film 27 of the first embodiment. The magnetic head of the fourth embodiment does not comprise the polishing stopper layer 28 of the first embodiment. The nonmagnetic film 63 is made of a nonmagnetic material and disposed in the grooves 64a, 64b and 64c to touch the surfaces of the grooves 64a, 64b and 64c. The material and thickness of the nonmagnetic film 63 are the same as those of the nonmagnetic film 27.

The pole layer 12 and the side shield layers 13E and 13F are disposed apart from the surfaces of the grooves 64a, 64b and 64c, respectively. The nonmagnetic film 63 is disposed between the surface of the groove 64a and the pole layer 12, and between the respective surfaces of the grooves 64b, 64c and the side shield layers 13E, 13F.

The magnetic head of the fourth embodiment comprises a polishing stopper layer 65 disposed between the encasing layer 64 and the first layer 13A in a region around the pole layer 12 and the side shield layers 13E and 13F. The material of the polishing stopper layer 65 is the same as that of the polishing stopper layer 28 of the first embodiment.

In the fourth embodiment, the pole layer 12 has a flat top surface. In the fourth embodiment, the throat height TH is the length of a portion of the first layer 13A taken in the direction orthogonal to the medium facing surface 30, the portion being opposed to the pole layer 12 with the gap layer 14 disposed in between.

Reference is now made to FIG. 37 to FIG. 42 to describe a method of manufacturing the magnetic head of the fourth embodiment. FIG. 37 to FIG. 42 are cross-sectional views of layered structures obtained in manufacturing process of the magnetic head. FIG. 37 to FIG. 42 show cross sections of portions of the layered structures near the medium facing surface, the cross sections being parallel to the medium facing surface. The portions closer to the substrate 1 than the top shield layer 7 are omitted in FIG. 37 to FIG. 42.

The method of manufacturing the magnetic head of the fourth embodiment includes the steps up to the step of flattening the top surfaces of the third portion 13C3, the second coupling portion 13D, the coil 11, and the insulating layers 23 and 24 as shown in FIG. 8A to FIG. 8C that are the same as those of the first embodiment.

Figure 37:
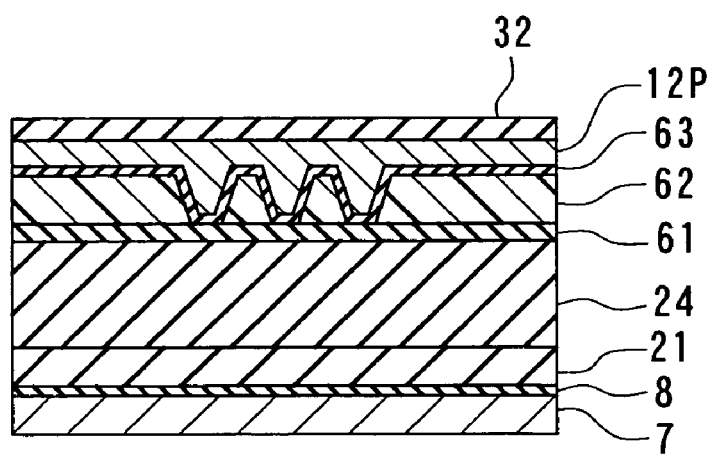
FIG. 37 is a cross-sectional view for illustrating a step of a method of manufacturing the magnetic head of the fourth embodiment of the invention.

FIG. 37 illustrates the following step. In the step, first, the insulating layer 61 is formed on the entire top surface of the layered structure. Next, the insulating layer 61 is selectively etched in a region where the first portion 13C1 and the second portion 13C2 will be disposed later and in a region above the second coupling portion 13D. Next, although not shown, the first portion 13C1 and the second portion 13C2 are formed on the third portion 13C3 by frame plating, for example.

Next, a photoresist layer 62 is formed on the entire top surface of the layered structure. Next, three grooves are formed in the photoresist layer 62 in regions where the pole layer 12 and the side shield layers 13E and 13F will be disposed later. Next, the nonmagnetic film 63 is formed on the entire top surface of the layered structure. The nonmagnetic film 63 is formed by a method the same as the method of forming the nonmagnetic film 27 of the first embodiment. Next, a portion of the nonmagnetic film 63 located on the second coupling portion 13D is selectively etched.

Next, the magnetic layer 12P to be the pole layer 12 and the side shield layers 13E and 13F is formed on the entire top surface of the layered structure. The magnetic layer 12P is formed by a method the same as that of the first embodiment. Next, the coating layer 32 made of alumina, for example, and having a thickness of 0.5 to 1.2 µm, for example, is formed on the entire top surface of the layered structure.

Figure 38:
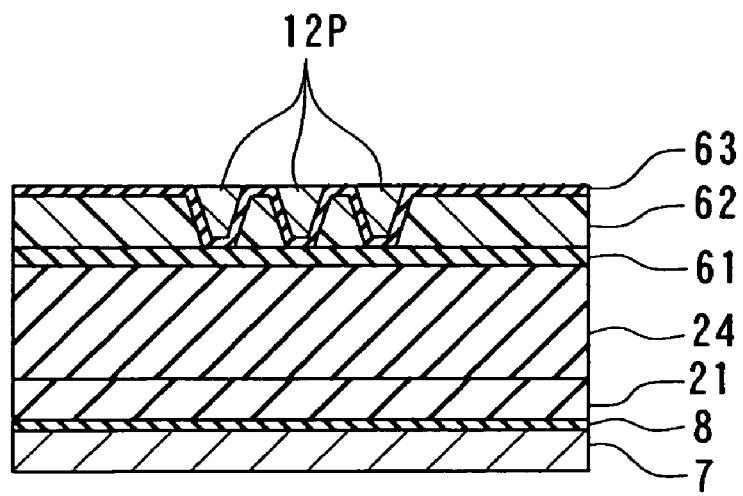
FIG. 38 is a cross-sectional view for illustrating a step that follows the step shown in FIG. 37.

Next, as shown in FIG. 38, the coating layer 32 and the magnetic layer 12P are polished by CMP, for example, so that the nonmagnetic film 63 is exposed, and the top surfaces of the nonmagnetic film 63 and the magnetic layer 12P are thereby flattened.

Figure 39:
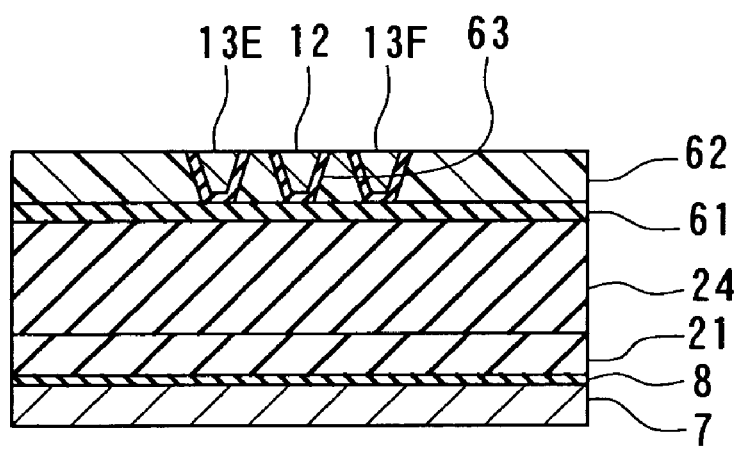
FIG. 39 is a cross-sectional view for illustrating a step that follows the step shown in FIG. 38.

Next, as shown in FIG. 39, the nonmagnetic film 63 and the magnetic layer 12P are slightly etched by ion beam etching, for example, such that a portion of the nonmagnetic film 63 located on the photoresist layer 62 is removed. The pole layer 12 and the side shield layers 13E and 13F are thereby formed of the portions of the magnetic layer 12P remaining after this etching.

Figure 40:
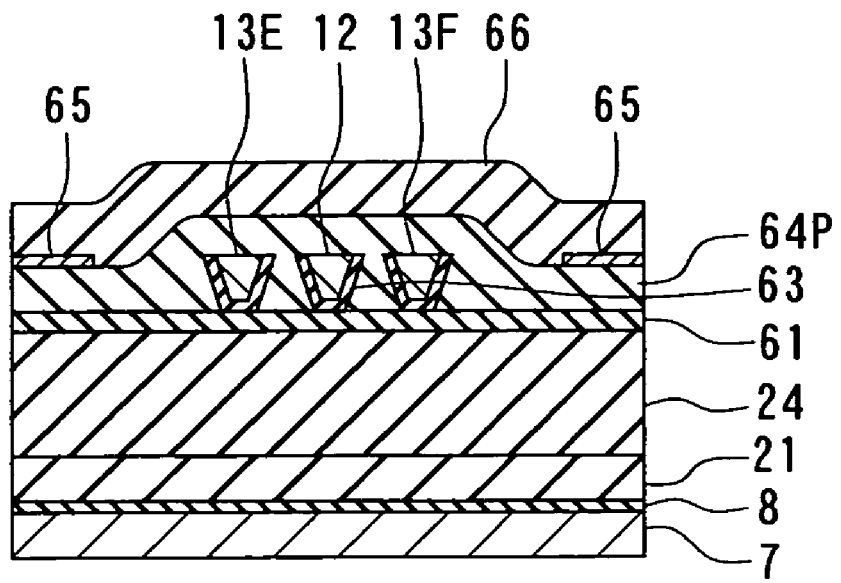
FIG. 40 is a cross-sectional view for illustrating a step that follows the step shown in FIG. 39.

FIG. 40 illustrates the following step. In the step, first, the photoresist layer 62 is removed. Next, a nonmagnetic layer 64P that will be the encasing layer 64 later is formed on the entire top surface of the layered structure, wherein the nonmagnetic layer 64P is formed to have a thickness equal to the value obtained by subtracting the thickness of the polishing stopper layer 65 to be formed later from the sum of a desired thickness of the pole layer 12 and the thickness of the nonmagnetic film 63. Next, the polishing stopper layer 65 is formed by sputtering, for example, on a region of the nonmagnetic layer 64P around the pole layer 12 and the side shied layers 13E and 13F. Next, a coating layer 66 of alumina, for example, is formed on the entire top surface of the layered structure by sputtering, for example.

Figure 41:
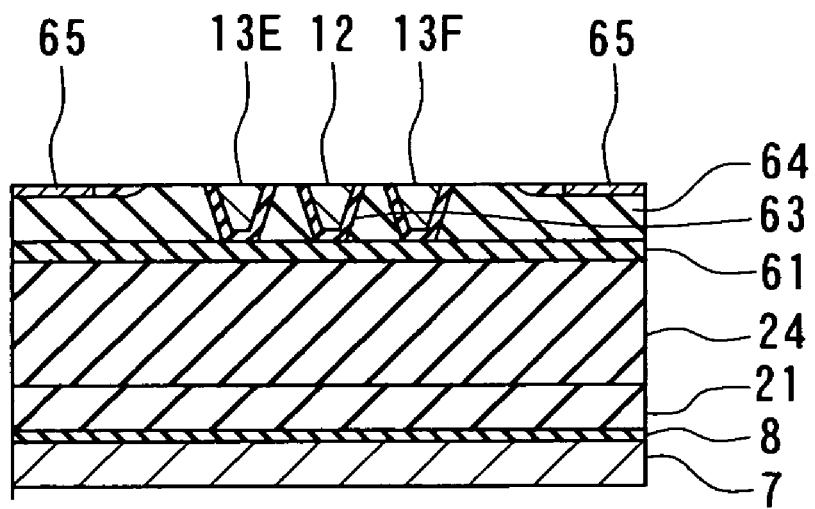
FIG. 41 is a cross-sectional view for illustrating a step that follows the step shown in FIG. 40.

Next, as shown in FIG. 41, the coating layer 66 and the nonmagnetic layer 64P are polished by CMP, for example, so that the polishing stopper layer 65 is exposed, and the top surfaces of the polishing stopper layer 65, the nonmagnetic layer 64P, the pole layer 12, and the side shield layers 13E and 13F are thereby flattened. The nonmagnetic layer 64P polished is formed into the encasing layer 64.

Figure 42:
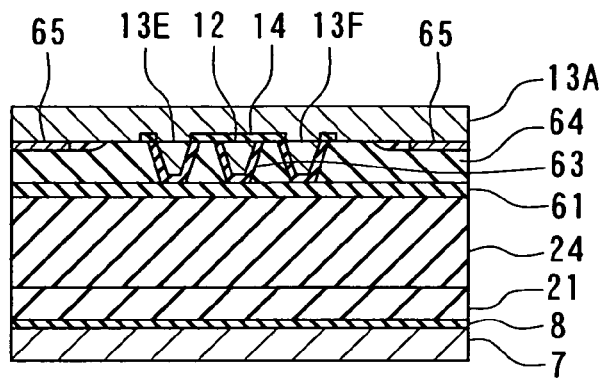
FIG. 42 is a cross-sectional view for illustrating a step that follows the step shown in FIG. 41.
Figure 43:
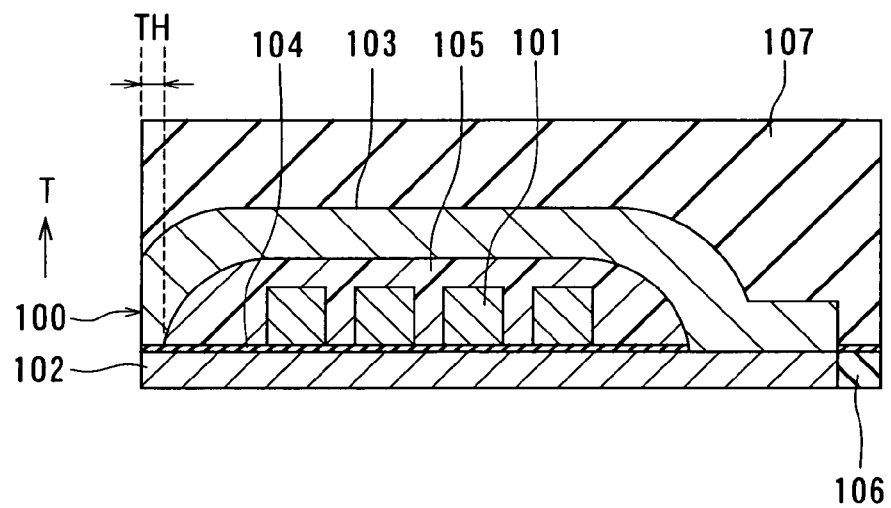
FIG. 43 is a cross-sectional view illustrating a main part of an example of the shield-type head.

FIG. 42 illustrates the following step. In the step, first, as in the step illustrated in FIG. 28 of the second embodiment, the gap layer 14 is formed and then selectively etched, using the mask 34. As a result, the top surfaces of the first portion 13C1, the second portion 13C2, and the side shield layers 13E and 13F are exposed, and a portion of the top surface of the pole layer 12 is exposed. Next, the mask 34 is removed.

Next, as in the step illustrated in FIG. 29 of the second embodiment, the first layer 13A is formed on the first portion 13C1, the second portion 13C2 and the gap layer 14. At the same time, the yoke layer 15 is formed on the pole layer 12. The first layer 13A touches the top surfaces of the side shield layers 13E and 13F. Next, as in the step illustrated in FIG. 16A to FIG. 16C of the first embodiment, the nonmagnetic layer 16 is formed on the entire top surface of the layered structure. Next, the nonmagnetic layer 16 is polished by CMP, for example, so that the first layer 13A and the yoke layer 15 are exposed, and the top surfaces of the first layer 13A, the yoke layer 15 and the nonmagnetic layer 16 are flattened.

Next, as in the step illustrated in FIG. 17A to FIG. 17C of the first embodiment, the protection layer 17 is formed to cover the entire top surface of the layered structure. Wiring and terminals are then formed on the protection layer 17, the substrate is cut into sliders, and the steps including polishing of the medium facing surface 30 and fabrication of flying rails are performed. The magnetic head is thus completed.

As in the second embodiment, the shield 13 of the fourth embodiment incorporates the side shield layers 13E and 13F. As a result, according to the embodiment, it is possible to further suppress expansion of the magnetic flux in regions on both sides of the end face of the pole layer 12 opposed to each other in the direction of track width and to further suppress leakage flux reaching the recording medium. It is thereby possible to further suppress the wide-range adjacent track erase. The remainder of configuration, function and effects of the fourth embodiment are similar to those of the first embodiment. It is possible to provide a modification example of the fourth embodiment similar to the second modification example of the first embodiment.

The present invention is not limited to the foregoing embodiments but may be practiced in still other ways. For example, in any of the first, second and fourth embodiments, the end face of the second layer 13B and the end face of the first coupling portion 13C (the first portion 13C1, the second portion 13C2 and the third portion 13C3) may be located in the medium facing surface 30 as in the second embodiment.

In the invention the pole layer may have a penetrating hole, and the first coupling portion of the shield may pass through this hole without touching the pole layer and couple the first layer to the second layer.

The pole layer of the invention is not limited to the one formed in the manner disclosed in each of the embodiments but may be formed otherwise. For example, the pole layer may be formed by patterning a magnetic layer by etching, or may be formed by plating.

While the magnetic head disclosed in each of the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end face located in the medium facing surface, allowing a magnetic flux corresponding to the field generated by the coil to pass therethrough, and generating a write magnetic field for writing the data on the recording medium by means of a perpendicular magnetic recording system; and
    a shield, wherein:
    the shield incorporates: a first layer having an end face located in a region of the medium facing surface forward of the end face of the pole layer along a direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion;
    the magnetic head further comprises a gap layer made of a nonmagnetic material and disposed between the pole layer and the first layer;
    in the medium facing surface, the end face of the first layer is located at a specific distance created by a thickness of the gap layer from the end face of the pole layer;
    the end face of the pole layer has a side located adjacent to the gap layer, the side defining a track width;
    part of the coil passes through a space surrounded by the pole layer, the second layer, the first coupling portion and the second coupling portion;
    the first coupling portion couples the first layer to the second layer on both sides of the pole layer opposed to each other in a direction of track width, the first coupling portion incorporating:
        a first portion and a second portion that are connected to the first layer and disposed on both sides of the pole layer opposed to each other in the direction of track width; and
        a third portion coupling the second layer to the first and second portions and disposed between the medium facing surface and the part of the coil; and
    the first layer is coupled to the pole layer through the first coupling portion, the second layer and the second coupling portion only, wherein the first coupling portion, the second layer and the second coupling portion form only one magnetic path for passing a magnetic flux between the first layer and the pole layer.

2. The magnetic head according to claim 1, wherein the gap layer has a thickness that falls within a range of 5 to 60 nm inclusive.

3. The magnetic head according to claim 1, wherein each of the second layer and the first coupling portion has an end face located in the medium facing surface.

4. The magnetic head according to claim 1, wherein the second layer has an end face closer to the medium facing surface, the end face being located at a distance from the medium facing surface.

5. The magnetic head according to claim 1, wherein the first coupling portion has an end face closer to the medium facing surface, the end face being located at a distance from the medium facing surface.

6. The magnetic head according to claim 1, wherein the shield further incorporates a first side shield layer and a second side shield layer that are connected to the first layer and disposed on both sides of the pole layer opposed to each other in a direction of track width; and each of the first and second side shield layers has an end face located in the medium facing surface.

7. The magnetic head according to claim 1, wherein the coil has a shape of flat whorl wound around the second coupling portion.

8. The magnetic head according to claim 1, wherein the coil has a helical shape wound around the pole layer.

9. The magnetic head according to claim 1, further comprising:
    an encasing layer made of a nonmagnetic material and having a groove that opens in a top surface thereof and accommodates at least part of the pole layer; and
    a nonmagnetic conductive layer made of a nonmagnetic conductive material and disposed in the groove of the encasing layer between the encasing layer and the pole layer.

10. The magnetic head according to claim 1, wherein: the pole layer has a surface that bends, the surface touching the gap layer; and the gap layer bends along the surface of the pole layer that bends.

11. The magnetic head according to claim 1, wherein:
    the first layer incorporates: a middle portion including a portion facing toward the pole layer with the gap layer disposed in between; and two side portions located at positions outside the middle portion along a direction of track width; and
    a maximum length of each of the side portions taken in a direction orthogonal to the medium facing surface is greater than a length of the middle portion taken in the direction orthogonal to the medium facing surface.

12. A method of manufacturing a magnetic head for perpendicular magnetic recording, the magnetic head comprising:
- a medium facing surface that faces toward a recording medium;
- a coil for generating a magnetic field corresponding to data to be written on the recording medium;
- a pole layer having an end face located in the medium facing surface, allowing a magnetic flux corresponding to the field generated by the coil to pass therethrough, and generating a write magnetic field for writing the data on the recording medium by means of a perpendicular magnetic recording system; and
- a shield, wherein:
- the shield incorporates: a first layer having an end face located in a region of the medium facing surface forward of the end face of the pole layer along a direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion;
- the magnetic head further comprises a gap layer made of a nonmagnetic material and disposed between the pole layer and the first layer;
- in the medium facing surface, the end face of the first layer is located at a specific distance created by a thickness of the gap layer from the end face of the pole layer;
- the end face of the pole layer has a side located adjacent to the gap layer, the side defining a track width; and
- part of the coil passes through a space surrounded by the pole layer, the second layer, the first coupling portion and the second coupling portion;
- the first coupling portion couples the first layer to the second layer on both sides of the pole layer opposed to each other in a direction of track width, the first coupling portion incorporating:
  - a first portion and a second portion that are connected to the first layer and disposed on both sides of the pole layer opposed to each other in the direction of track width; and
  - a third portion coupling the second layer to the first and second portions and disposed between the medium facing surface and the part of the coil; and
- the first layer is coupled to the pole layer through the first coupling portions, the second layer and the second coupling portion only, wherein the first coupling portion, the second layer and the second coupling portion form only one magnetic path for passing a magnetic flux between the first layer and the pole layer, the method comprising the steps of:
- forming the second layer;
- forming the coil;
- forming the first and second coupling portions;
- forming the pole layer;
- forming the gap layer on the pole layer; and
- forming the first layer on the gap layer.

13. The method according to claim 12, wherein the gap layer has a thickness that falls within a range of 5 to 60 nm inclusive.

14. The method according to claim 12, wherein each of the second layer and the first coupling portion has an end face located in the medium facing surface.

15. The method according to claim 12, wherein the second layer has an end face closer to the medium facing surface, the end face being located at a distance from the medium facing surface.

16. The method according to claim 12, wherein the first coupling portion has an end face closer to the medium facing surface, the end face being located at a distance from the medium facing surface.

17. The method according to claim 12, wherein the shield further incorporates a first side shield layer and a second side shield layer that are connected to the first layer and disposed on both sides of the pole layer opposed to each other in a direction of track width; and each of the first and second side shield layers has an end face located in the medium facing surface,
the method further comprising the step of forming the first and second side shield layers performed between the step of forming the second layer and the step of forming the gap layer.

18. The method according to claim 12, wherein the coil has a shape of flat whorl wound around the second coupling portion.

19. The method according to claim 12, wherein the coil has a helical shape wound around the pole layer.

20. The method according to claim 12, wherein the magnetic head further comprises: an encasing layer made of a nonmagnetic material and having a groove that opens in a top surface thereof and accommodates at least part of the pole layer; and a nonmagnetic conductive layer made of a nonmagnetic conductive material and disposed in the groove of the encasing layer between the encasing layer and the pole layer,
the method further comprising the steps of forming the encasing layer and forming the nonmagnetic conductive layer.

21. The method according to claim 20, wherein the nonmagnetic conductive layer is formed by chemical vapor deposition in which formation of a single atomic layer is repeated.

22. The method according to claim 21, wherein the nonmagnetic conductive material is Ta or Ru.

23. The method according to claim 12, wherein: the pole layer has a surface that bends, the surface touching the gap layer; and the gap layer bends along the surface of the pole layer that bends.

24. The method according to claim 23, wherein the gap layer is formed by chemical vapor deposition in which formation of a single atomic layer is repeated.

25. The method according to claim 24, wherein the nonmagnetic material forming the gap layer is Ta, Ru or $Al_2O_3$.

26. The method according to claim 12, wherein:
- the first layer incorporates: a middle portion including a portion facing toward the pole layer with the gap layer disposed in between; and two side portions located at positions outside the middle portion along a direction of track width; and
- a maximum length of each of the side portions taken in a direction orthogonal to the medium facing surface is greater than a length of the middle portion taken in the direction orthogonal to the medium facing surface.

27. A magnetic head for perpendicular magnetic recording comprising:
- a medium facing surface that faces toward a recording medium;
- a coil for generating a magnetic field corresponding to data to be written on the recording medium;
- a pole layer having an end face located in the medium facing surface, allowing a magnetic flux corresponding to the field generated by the coil to pass therethrough, and generating a write magnetic field for writing the data on the recording medium by means of a perpendicular magnetic recording system; and a shield, wherein:

the shield incorporates: a first layer having an end face located in a region of the medium facing surface forward of the end face of the pole layer along a direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion;

the magnetic head further comprises a gap layer made of a nonmagnetic material and disposed between the pole layer and the first layer;

in the medium facing surface, the end face of the first layer is located at a specific distance created by a thickness of the gap layer from the end face of the pole layer;

the end face of the pole layer has a side located adjacent to the gap layer, the side defining a track width;

part of the coil passes through a space surrounded by the pole layer, the second layer, the first coupling portion and the second coupling portion;

the first coupling portion incorporates: a first portion and a second portion that are connected to the first layer and disposed on both sides of the pole layer opposed to each other in a direction of track width; and a third portion coupling the second layer to the first and second portions and disposed between the medium facing surface and the part of the coil; and the first coupling portion couples the first layer to the second layer on both sides of the pole layer opposed to each other in the direction of track width.

28. A method of manufacturing a magnetic head for perpendicular magnetic recording, the magnetic head comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium by means of a perpendicular magnetic recording system; and a shield, wherein:

the shield incorporates: a first layer having an end face located in a region of the medium facing surface forward of the end face of the pole layer along a direction of travel of the recording medium; a second layer disposed in a region sandwiching the pole layer with the first layer; a first coupling portion coupling the first layer to the second layer without touching the pole layer; and a second coupling portion coupling the pole layer to the second layer and located farther from the medium facing surface than the first coupling portion;

the magnetic head further comprises a gap layer made of a nonmagnetic material and disposed between the pole layer and the first layer;

in the medium facing surface, the end face of the first layer is located at a specific distance created by a thickness of the gap layer from the end face of the pole layer;

the end face of the pole layer has a side located adjacent to the gap layer, the side defining a track width; and part of the coil passes through a space surrounded by the pole layer, the second layer, the first coupling portion and the second coupling portion, the method comprising the steps of:

forming the second layer;

forming the coil;

forming the first and second coupling portions;

forming the pole layer;

forming the gap layer on the pole layer; and forming the first layer on the gap layer, wherein:

the first coupling portion incorporates: a first portion and a second portion that are connected to the first layer and disposed on both sides of the pole layer opposed to each other in a direction of track width; and a third portion coupling the second layer to the first and second portions and disposed between the medium facing surface and the part of the coil; and the first coupling portion couples the first layer to the second layer on both sides of the pole layer opposed to each other in the direction of track width.

* * * * *